US011895461B2

(12) United States Patent
Asada et al.

(10) Patent No.: US 11,895,461 B2
(45) Date of Patent: Feb. 6, 2024

(54) ACOUSTIC REPRODUCTION SYSTEM, DISPLAY DEVICE, AND CALIBRATION METHOD

(71) Applicant: SONY GROUP CORPORATION, Tokyo (JP)

(72) Inventors: Kohei Asada, Tokyo (JP); Go Igarashi, Tokyo (JP); Kazunobu Ookuri, Tokyo (JP); Yoshiyuki Kuroda, Tokyo (JP); Naoki Shinmen, Tokyo (JP); Chisato Numaoka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/757,004

(22) PCT Filed: Oct. 23, 2020

(86) PCT No.: PCT/JP2020/039961
§ 371 (c)(1),
(2) Date: Jun. 7, 2022

(87) PCT Pub. No.: WO2021/124679
PCT Pub. Date: Jun. 24, 2021

(65) Prior Publication Data

US 2023/0009189 A1 Jan. 12, 2023

(30) Foreign Application Priority Data

Dec. 20, 2019 (JP) ................................ 2019-230830

(51) Int. Cl.
*H04R 1/34* (2006.01)
*H04R 7/04* (2006.01)

(52) U.S. Cl.
CPC ................ *H04R 1/34* (2013.01); *H04R 7/04* (2013.01)

(58) Field of Classification Search
CPC ... H04R 1/34; H04R 7/04; H04R 3/14; H04R 2499/15; H04R 1/345
See application file for complete search history.

(56) References Cited

U.S. PATENT DOCUMENTS

2008/0289899 A1* 11/2008 Kliegle ................ E04B 9/0414 181/210
2018/0184202 A1 6/2018 Walther et al.

FOREIGN PATENT DOCUMENTS

CN 108141662 A 6/2018
EP 3128762 A1 2/2017
(Continued)

OTHER PUBLICATIONS

International Search Report and Written Opinion of PCT Application No. PCT/JP2020/039961, dated Dec. 22, 2020, 09 pages of ISRWO.

*Primary Examiner* — Tuan D Nguyen
(74) *Attorney, Agent, or Firm* — CHIP LAW GROUP

(57) ABSTRACT

Provided is an acoustic reproduction system capable of setting a sound image localization service area at an arbitrary position even in a case where a sound production direction of a directional sound cannot be changed. An acoustic reproduction system according to the present technology includes a sound producing device that emits a directional sound and a sound reflector positioned between a viewer and a viewing target by the viewer and having a sound reflecting surface that reflects the directional sound emitted by the sound producing device.

19 Claims, 32 Drawing Sheets

(56) References Cited

FOREIGN PATENT DOCUMENTS

| | | | | |
|---|---|---|---|---|
| JP | 9-233588 | A | | 9/1997 |
| JP | 2005-227449 | A | | 8/2005 |
| JP | 2005-269402 | A | | 9/2005 |
| JP | 3826423 | B2 | | 9/2006 |
| JP | 2007-080442 | A | | 3/2007 |
| JP | 2017028423 | | * | 2/2017 |
| JP | 2018-527808 | A | | 9/2018 |
| KR | 10-2018-0059423 | A | | 6/2018 |
| WO | 2017/021162 | A1 | | 2/2017 |

* cited by examiner

ACOUSTIC REPRODUCTION SYSTEM, DISPLAY DEVICE, AND CALIBRATION METHOD

CROSS REFERENCE TO RELATED APPLICATIONS

This application is a U.S. National Phase of International Patent Application No. PCT/JP2020/039961 filed on Oct. 23, 2020, which claims priority benefit of Japanese Patent Application No. JP 2019-230830 filed in the Japan Patent Office on Dec. 20, 2019. Each of the above-referenced applications is hereby incorporated herein by reference in its entirety.

TECHNICAL FIELD

The present technology relates to an acoustic reproduction system including a sound producing device that emits a directional sound and a sound reflector having a sound reflecting surface that reflects the directional sound emitted by the sound producing device, a display device including a self-luminous display unit that displays a video, and a calibration method for the acoustic reproduction system.

BACKGROUND ART

For example, as disclosed in Patent Documents 1 and 2 below, there is known a technique of causing a target person to perceive (localize) a sound image in the vicinity of a reflection position of a directional sound by reflecting the directional sound on a predetermined reflecting surface such as a wall surface in a room, a display surface of a display device, and the like and allowing the target person to listen to the directional sound. For example, in a case where the directional sound is reflected at the center of the display surface of the display device, the sound image can be localized at the center of the display surface.

CITATION LIST

Patent Document

Patent Document 1: Japanese Patent No. 3826423
Patent Document 2: Japanese Patent Application Laid-Open No. 2005-269402

SUMMARY OF THE INVENTION

Problems to be Solved by the Invention

In the sound image localization technique using reflection on the sound reflecting surface as described above, it is possible to change a reflection position and a reflection angle of the directional sound on the reflecting surface by changing a sound production direction of the directional sound or changing an inclination angle of the reflecting surface. Thus, it is possible to adjust a position where the sound image is localized and a sound image localization service area as an area in which sound image localization can be perceived.

At this time, for example, in a case where the directional sound is reflected on the display surface of the display device or the wall surface in the room exemplified above, it is difficult to incline the display surface or the wall surface (for example, if the display surface is inclined, it is difficult to see content, which leads to deterioration of a display characteristic of the content). Therefore, it is conceivable that adjustment of the sound image localization service area is performed by adjusting the sound production direction of the directional sound.

However, as a system that performs acoustic reproduction of the directional sound, a system that cannot change the sound production direction of the directional sound is also conceivable. In this case, the reflection angle of the directional sound cannot be changed, and it is difficult to set the sound image localization service area at a desired position.

The present invention has been made in view of the circumstances described above, and an object thereof is to provide an acoustic reproduction system capable of setting a sound image localization service area at an arbitrary position even in a case where a sound production direction of a directional sound cannot be changed.

Solutions to Problems

An acoustic reproduction system according to the present technology includes: a sound producing device that emits a directional sound; and a sound reflector positioned between a viewer and a viewing target by the viewer and having a sound reflecting surface that reflects the directional sound emitted by the sound producing device.

The viewing target means an object to be viewed by the viewer, and for example, in a case where content to be viewed is displayed via a display device, a display unit of the display device corresponds to the viewing target. Alternatively, a case where the content to be viewed is demonstration content such as a play and the like is also conceivable. The viewing target in that case corresponds to an object constituting the demonstration content such as a performer, various stage tools arranged on a stage, and the like. By reflecting the directional sound by the sound reflecting surface disposed between such a viewing target and the viewer, a reflection angle of the directional sound can be arbitrarily determined by setting an inclination angle of the sound reflecting surface.

In the acoustic reproduction system according to the present technology described above, it is possible to have a configuration in which the sound producing device emits a sound by a plane wave.

Therefore, attenuation of the sound reflected from the sound reflecting surface to the viewer side is suppressed.

In the acoustic reproduction system according to the present technology described above, it is possible that the sound producing device has a sound producing unit configured with a plane wave speaker.

As the plane wave speaker, it is conceivable to use a dynamic-based plane wave speaker that vibrates a plane panel by a movable coil, or a plane wave speaker using an electrostatic diaphragm or a piezoelectric diaphragm.

In the acoustic reproduction system according to the present technology described above, the plane wave speaker can have a configuration in which a diaphragm is disposed non-parallel to a bottom surface.

With a structure in which the diaphragm is disposed non-parallel to the bottom surface, it is easy to increase volume on a back side of the diaphragm in a case where it is assumed that the plane wave is emitted in an oblique direction.

In the acoustic reproduction system according to the present technology described above, it is possible to have a configuration in which the sound producing device includes a speaker array including a plurality of speakers as a sound producing unit and emits the directional sound from the speaker array by applying predetermined audio signal processing to an audio signal to be output by the speakers in the speaker array.

Therefore, it is possible to adjust an incident angle of the directional sound on the sound reflecting surface without providing a mechanical angle adjustment mechanism for the speaker.

In the acoustic reproduction system according to the present technology described above, it is possible to have a configuration in which the sound reflector has optical transparency.

Therefore, it is possible to suppress deterioration in visibility of the viewing target due to the provision of the sound reflector.

In the acoustic reproduction system according to the present technology described above, it is possible to have a configuration in which the sound reflecting surface is a half mirror.

Therefore, it is possible to make a video appear on the sound reflecting surface located in front of the viewing target as viewed from the viewer by using the principle of the Pepper's ghost.

In the acoustic reproduction system according to the present technology described above, it is possible to have a configuration in which the sound reflector is inclined to the viewer side, and the sound producing device emits the directional sound from a floor side to the sound reflecting surface.

Therefore, a reflected sound from the sound reflecting surface can be inclined upward from a horizontal direction.

In the acoustic reproduction system according to the present technology described above, it is possible to have a configuration in which the sound producing device emits the directional sound so as to have an incident angle in a lateral direction with respect to the sound reflecting surface.

Therefore, it is possible for the viewer having a different lateral position with respect to a position where the directional sound is emitted to perceive a sound source position in the vicinity of a reflection position of the directional sound.

In the acoustic reproduction system according to the present technology described above, it is possible to have a configuration in which the sound reflector is formed in a plate shape.

Therefore, it is possible to form the sound reflecting surface without applying tension to the sound reflector as in a case where the sound reflector has a film shape.

In the acoustic reproduction system according to the present technology described above, it is possible to have a configuration in which the sound reflector is suspended from a ceiling side.

The suspension-type support system from the ceiling is suitable as a support system for a large and heavy panel.

In the acoustic reproduction system according to the present technology described above, it is possible to have a configuration in which two sound reflecting surfaces having mutually different inclination directions are provided as the sound reflecting surfaces and the sound producing device emits the directional sounds from a ceiling side to one of the sound reflecting surfaces and from a floor side to another of the sound reflecting surfaces.

Therefore, it is possible to cause reflected sounds of the directional sounds emitted from the ceiling side and the floor side to cross in a vertical direction in front of the viewers.

The acoustic reproduction system according to the present technology described above can include a reflector inclination angle adjustment unit that adjusts an inclination angle of the sound reflector.

Therefore, the incident angle and the reflection angle of the directional sound can be adjusted by adjusting the inclination angle of the sound reflector.

The acoustic reproduction system according to the present technology described above can include a direction adjustment unit that adjusts a sound production direction of the directional sound.

Therefore, it is possible to adjust the incident angle and the reflection angle of the directional sound with respect to the sound reflecting surface by adjusting the sound production direction.

In the acoustic reproduction system according to the present technology described above, it is possible to have a configuration in which the sound producing device has a sound producing unit configured with a directional speaker and in which the direction adjustment unit adjusts the sound production direction of the directional sound by adjusting an angle of the directional speaker.

Therefore, it is not necessary to perform audio signal processing for sound production direction adjustment when adjusting the sound production direction of the directional sound.

In the acoustic reproduction system according to the present technology described above, it is possible to have a configuration in which the sound producing device includes a speaker array including a plurality of speakers as a sound production unit and emits the directional sound from the speaker array by applying predetermined audio signal processing to an audio signal to be output by the speakers in the speaker array and in which the direction adjustment unit adjusts the sound production direction of the directional sound by the audio signal processing.

Therefore, a mechanical drive sound is not generated in adjusting the sound production direction of the directional sound.

In the acoustic reproduction system according to the present technology described above, it is possible to have a configuration in which the viewing target is a display unit of a self-luminous display device.

In a case where content to be viewed is displayed by the display device, it is not possible to adopt a sound image localization method by arranging speakers on the back side of a display surface (screen) as in a case where display is performed by screen projection. It is conceivable to arrange speakers on the left and right of the display surface, but in this case, the display device becomes large.

In the acoustic reproduction system according to the present technology described above, it is possible to have a configuration in which a speaker constituting a sound producing unit of the sound producing device is disposed near a floor between the sound reflector and the viewer.

A theater facility can be exemplified as a facility for showing viewing content. In the theater facility, a certain space is usually taken between a portion where a viewing target is arranged and a seat portion where seats of viewers are arranged.

Furthermore, a display device according to the present technology includes: a self-luminous display unit that displays a video; and a sound reflector disposed in front of a display surface of the video on the display unit and having a sound reflecting surface that reflects a sound.

Therefore, the sound reflecting surface is located between a viewer and a viewing target of the viewer. Therefore, in an acoustic reproduction system that reflects a directional sound on the sound reflecting surface to localize a sound image, a reflection angle of the directional sound can be arbitrarily determined by setting an inclination angle of the sound reflecting surface.

Furthermore, a calibration method according to the present technology is a calibration method of an acoustic reproduction system including a sound producing device that emits a directional sound, a sound reflector positioned between a viewer and a viewing target by the viewer and having a sound reflecting surface that reflects the directional sound emitted by the sound producing device, and a control unit that controls an incident angle of the directional sound on the sound reflecting surface, the calibration method including: learning a change in a sound pickup signal of the directional sound reflected by the sound reflecting surface with respect to a change in the incident angle, and adjusting the incident angle on the basis of a result of the learning.

Therefore, it is possible to adjust the incident angle of the directional sound, that is, adjust sound image localization so that a sound received by the viewer approaches a target sound.

MODE FOR CARRYING OUT THE INVENTION

Hereinafter, an embodiment according to the present technology will be described in the following order with reference to the accompanying drawings.

<1. Acoustic Reproduction System as Embodiment>

<2. Calibration>

<3. Modifications>

<4. Summary of Embodiment>

<5. Present Technology>

<1. Acoustic Reproduction System as Embodiment>

Figure 1:
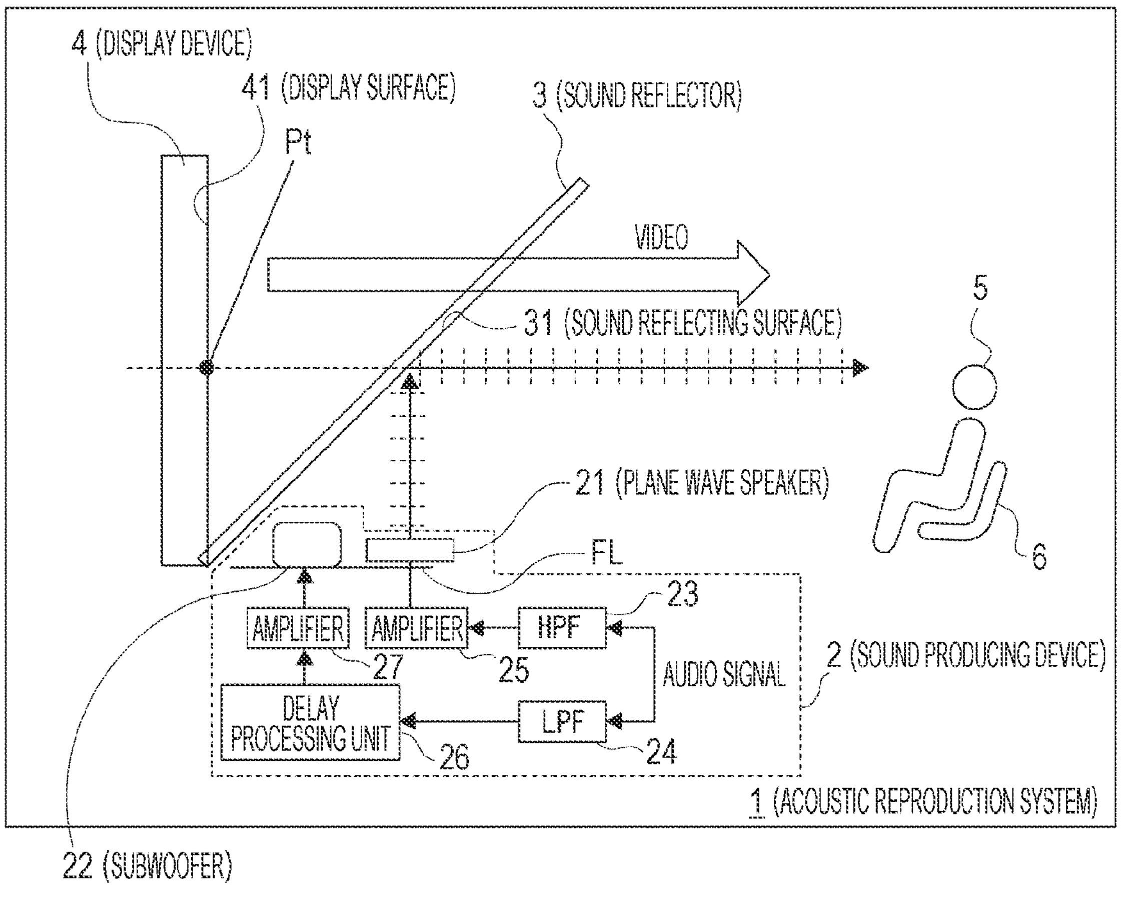
FIG. 1 is a diagram illustrating a configuration example of an acoustic reproduction system as an embodiment.

FIG. 1 illustrates a configuration example of an acoustic reproduction system 1 as an embodiment according to the present technology.

As illustrated, the acoustic reproduction system 1 includes a sound producing device 2 that emits a directional sound (a sound having directivity), a sound reflector 3 having a sound reflecting surface 31 that reflects the directional sound emitted by the sound producing device 2, and a self-luminous display device 4 that displays a video.

The acoustic reproduction system 1 is a system for allowing a viewer 5 to view viewing content by a video and a sound, the display device 4 displays the video constituting the viewing content, and the sound producing device 2 emits the sound constituting the viewing content.

In the present example, a theater facility is assumed as an application destination of the acoustic reproduction system 1, and a large display device having a screen size exceeding 100 inches, for example, is used as the display device 4. In the theater facility, a seat 6 is arranged at a position facing a display surface 41 (video display screen) of the display device 4, and it is assumed that the viewer 5 views the content while seated on the seat 6 as illustrated in the drawing.

Hereinafter, a front-rear direction is defined with reference to the display surface 41 of the video on the display device 4. Specifically, a direction from a back surface side, which is a surface on a side opposite to the display surface 41 on the display device 4, to the display surface 41 side (that is, a display output direction of a video) is defined as a front.

The sound reflector 3 includes a plate-shaped transparent member (member having optical transparency). Examples of the transparent member used as the sound reflector 3 include glass and resin such as acrylic, polycarbonate, and the like.

In the acoustic reproduction system 1 of the present example, the sound producing device 2 emits a sound by a plane wave as a directional sound. Therefore, the sound producing device 2 includes a plane wave speaker 21 that emits a sound by a plane wave. As the plane wave speaker 21, a dynamic-based plane wave speaker that vibrates a plane panel with a movable coil, or a plane wave speaker using an electrostatic diaphragm or a piezoelectric diaphragm can be used.

In the acoustic reproduction system 1 of the present example, the sound reflector 3 is disposed at a position in front of the display device 4 in a state of being inclined forward from an upright state. Then, the plane wave speaker 21 emits a plane wave from a floor FL side to a front surface of the sound reflector 3. In this case, the front surface of the sound reflector 3 functions as the sound reflecting surface 31 for the plane wave, and a sound by the plane wave reflected by the sound reflecting surface 31 is emitted toward the viewer 5. At this time, a reflection position of the plane wave in a height direction substantially coincides with a center position of the display surface 41 in the height direction.

FIG. 1 illustrates an example in which a forward inclination angle of the sound reflector 3 is set to 45 degrees and a plane wave is emitted in a vertical direction. In this case, since the video from the display device 4 reaches the viewer 5 straight forward, the viewer 5 can feel the sound from the plane wave speaker 21 at the center position of the display surface 41 as a "sound source position" (in the drawing, see a position Pt). This is a suitable method, for example, when listening to a speech sound of a movie. In a case of application to the speech sound, attention of the viewer 5 is attracted to a character who is speaking his/her lines on a video, so that a sound image is easily perceived as being localized at a position of the character.

Here, in order to sufficiently output the plane wave to a low frequency, it is necessary to drive a considerably large plane panel as the plane wave speaker 21. In this case, it is inevitable that a size of the plane wave speaker 21 will be increased. Therefore, a configuration is considered in which the plane wave speaker 21 outputs middle and high frequency sounds having a predetermined frequency (for example, 200 Hz) or higher, and a subwoofer is responsible for a low frequency sound having a frequency lower than the predetermined frequency.

As shown in the drawing, the sound producing device 2 of the present example includes a subwoofer 22 together with the plane wave speaker 21, and moreover, includes a high pass filter (HPF) 23 that extracts middle and high frequency signal components of an audio signal, a low pass filter (LPF) 24 that extracts a low frequency signal component of the audio signal, an amplifier 25 that drives the plane wave speaker 21 by amplifying the middle and high frequency signal components extracted by the HPF 23, a delay processing unit 26 that delays the low frequency signal component extracted by the LPF 24, and an amplifier 27 that drives the subwoofer 22 by amplifying the low frequency signal component input via the delay processing unit 26.

Here, even if the low frequency signal component is output as it is from the subwoofer 22, localization of a sound is generally pulled toward a high frequency side, and thus has little influence. However, in the present example, the low frequency signal component delayed by, for example, about several ms by the delay processing unit 26 is output from the subwoofer 22. Therefore, localization is more attracted to a sound wave from the plane wave speaker 21 by a Haas effect.

As illustrated in FIG. 1, in the present example, the subwoofer 22 is disposed on the floor FL, but a position where the subwoofer 22 is disposed is not limited to the floor FL.

Figure 2:
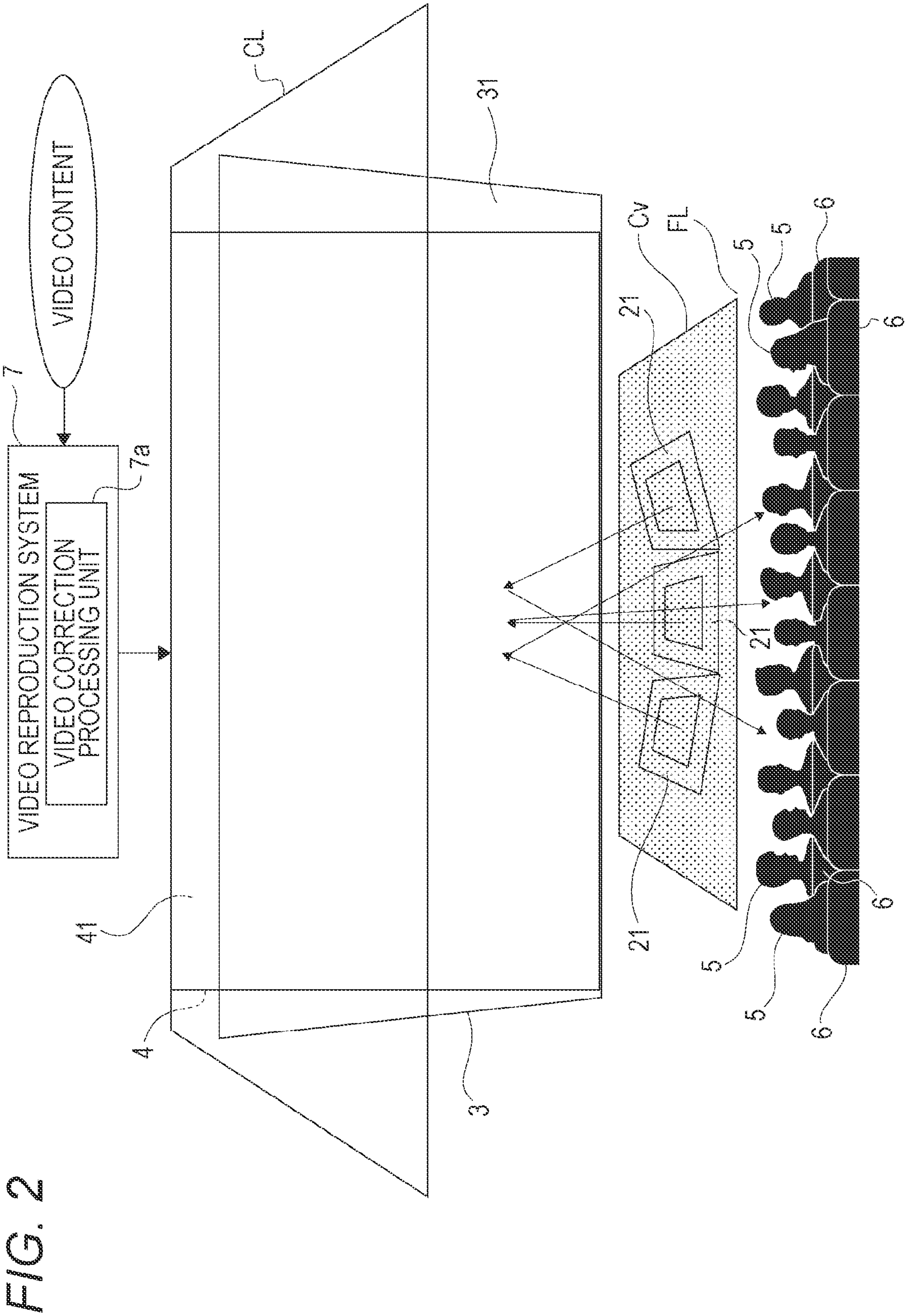
FIG. 2 is a diagram for explaining an arrangement example of plane wave speakers.

FIG. 2 is a diagram for explaining an arrangement example of the plane wave speakers 21. Note that FIG. 2 illustrates an image when the theater facility is looked down from a position facing the display surface 41 of the display device 4. Furthermore, a ceiling CL in the theater facility is schematically illustrated in the drawing.

As illustrated in the drawing, the plurality of plane wave speakers 21 can be disposed. In other words, it is possible to adopt a configuration in which a plane wave emitted from each of the plurality of plane wave speakers 21 is reflected by the sound reflecting surface 31 and is received by the viewer 5.

It is conceivable that positions where the plane wave speakers 21 are arranged are in the vicinity of the floor FL between the viewers 5 and the sound reflector 3 as illustrated in the drawing. In a theater facility, a certain space is usually taken between a viewing target (the display screen of the display device 4 in the present example) and a seat portion where seats of viewers are arranged. The arrangement of the plane wave speakers 21 as described above is suitable for the theater facility in which the space is taken between the viewing target and the seat portion in this manner.

Furthermore, in a case where the plane wave speakers 21 are disposed near the floor FL, it is conceivable that the plane wave speakers 21 are covered with an acoustic transmission sheet as illustrated as a cover Cv in the drawing. As the cover Cv, for example, a cloth, a fabric, and the like having acoustic transmissivity is used. The cover Cv makes it difficult for the viewers 5 to notice presence of the plane wave speakers 21.

Furthermore, the plane wave speakers 21 can also be disposed so as to be inclined in a lateral direction, like the plane wave speakers 21 disposed at both left and right ends among the three plane wave speakers 21 illustrated in the drawing. That is, the plane wave is emitted so as to have an incident angle in the lateral direction with respect to the sound reflecting surface 31.

Therefore, the viewer 5 having a different lateral position with respect to a position where the plane wave is emitted can perceive the sound source position in the vicinity of the reflection position of the plane wave. Therefore, it is easy to expand an area in which sound image localization can be perceived (hereinafter referred to as a "sound image localization service area AL") in the lateral direction. For example, in the illustrated example, each of the plane wave speakers 21 reflects the plane wave near a center position in the lateral direction of the sound reflecting surface 31. In this case, each of the viewers 5 who listens to a reflected sound of the plane wave emitted by each of the plane wave speakers 21 perceives presence of the sound source near the center position in the lateral direction of the sound reflecting surface 31. In a case where the left and right plane wave speakers 21 are not inclined in the lateral direction, the sound image localization service area AL has a width of approximately the three plane wave speakers 21. By inclining the left and right plane wave speakers 21 in the lateral direction, the width of the sound image localization service area AL can be larger than the width of the three plane wave speakers 21.

Furthermore, if the plane wave is emitted so as to have the incident angle in the lateral direction with respect to the sound reflecting surface 31 as described above, it is possible to reduce the number of speakers to be used for expanding the sound image localization service area AL in the lateral direction.

Here, in the acoustic reproduction system 1, since the sound reflector 3 is disposed in front of the display device 4, it can be assumed that the viewer 5 feels uncomfortable about image quality. In this case, it is also conceivable that a video correction processing unit 7*a* is provided in a video reproduction system 7 that reproduces a video signal displayed on the display device 4 and that video signal processing for image quality correction is performed by the video correction processing unit 7*a*.

Figure 3:
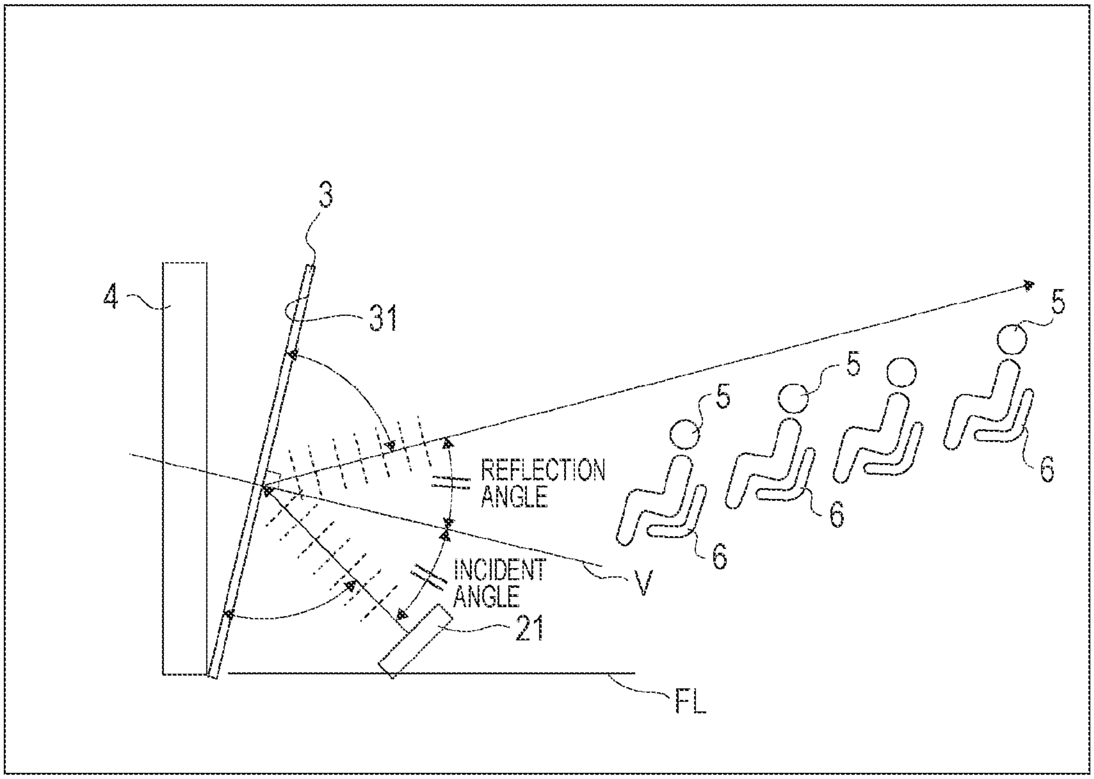
FIG. 3 is a diagram for explaining a relationship between an incident angle and a reflection angle in a sound reflector.

FIG. 3 is a diagram for explaining a relationship between an incident angle and a reflection angle in the sound reflector 3.

Note that illustration of the subwoofer 22 described in FIG. 1 is omitted in the following description. If a reproducible band of the plane wave speaker 21 is wide, the subwoofer 22 can be made unnecessary.

Furthermore, in the following description, illustration of the configuration for driving the speaker on the basis of the audio signal (the HPF 23, the LPF 24, the amplifiers 25 and 27, and the delay processing unit 26 in FIG. 1) in the configuration of the sound producing device 2 is also omitted.

In FIG. 1 above, a case where the forward inclination angle of the sound reflector 3 is 45 degrees has been exemplified, but here, a case where the forward inclination angle is other than 45 degrees is considered.

As a theater facility, in many cases, the plurality of seats 6 is arranged in front-rear and left-right directions, and a height of the seats 6 arranged in the front-rear direction gradually increases from the front to the rear as illustrated in the drawing. In such a case, considering enlargement of the sound image localization service area AL, it is desirable to incline a reflection direction of the plane wave from a horizontal direction (specifically, to incline upward).

Here, in the drawing, the incident angle (expressed as an "incident angle" in the drawing) and the reflection angle (expressed as a "reflection angle" in the drawing) of the plane wave with respect to the sound reflecting surface 31 are schematically illustrated, but the incident angle and an emission angle in this case are angles formed by a perpendicular line V with respect to the sound reflecting surface 31.

Figure 4:
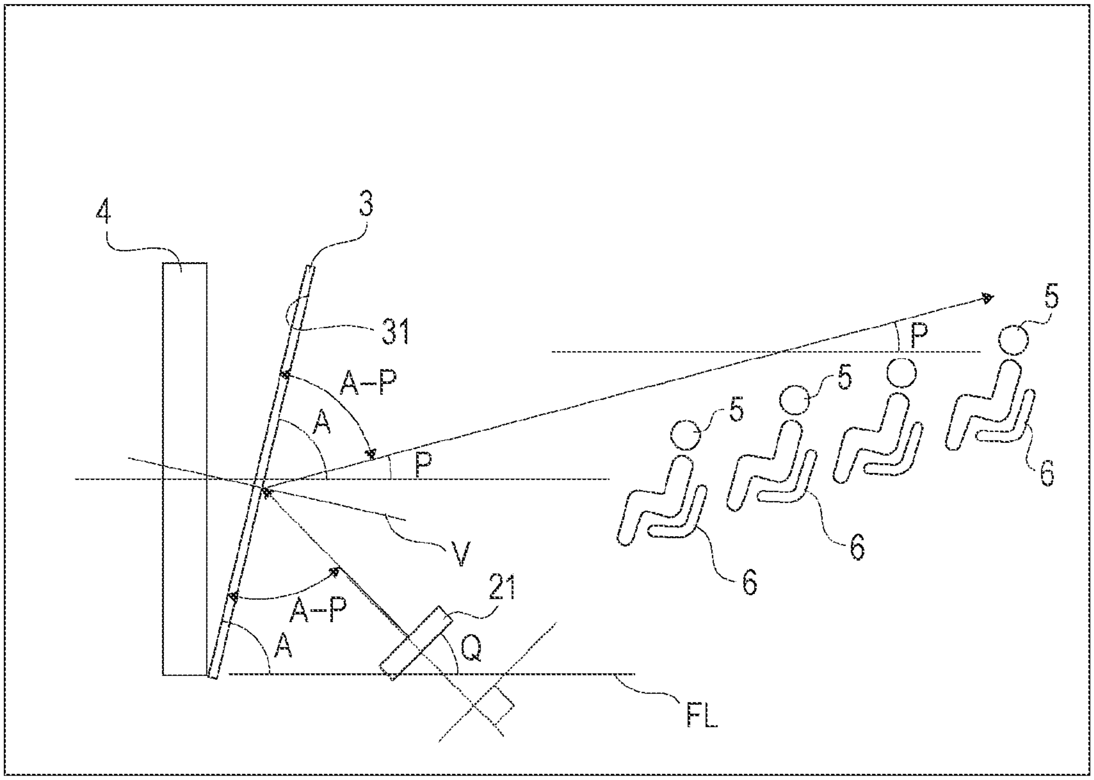
FIG. 4 is an explanatory diagram of an angle setting method.

FIG. 4 is an explanatory diagram of an angle setting method.

As illustrated in the drawing, an inclination angle of the sound reflector 3 with reference to the horizontal direction is referred to as an "inclination angle A", an emission angle of the plane wave emitted from the plane wave speaker 21 with reference to the horizontal direction is referred to as an "emission angle Q" (here, coinciding with an angle at which the plane wave speaker 21 is inclined), and an inclination angle of the plane wave reflected by the sound reflecting surface 31 in a traveling direction with respect to the horizontal direction is referred to as a "traveling angle P". In this case, a relationship between the angles can be expressed as "Q=2A−P−90". Therefore, for example, in a case where the inclination angle A of the sound reflector 3 is 70 degrees, the emission angle Q of the plane wave is only required to be 35 degrees in a case where the traveling angle P to be realized is 15 degrees.

Figure 5:
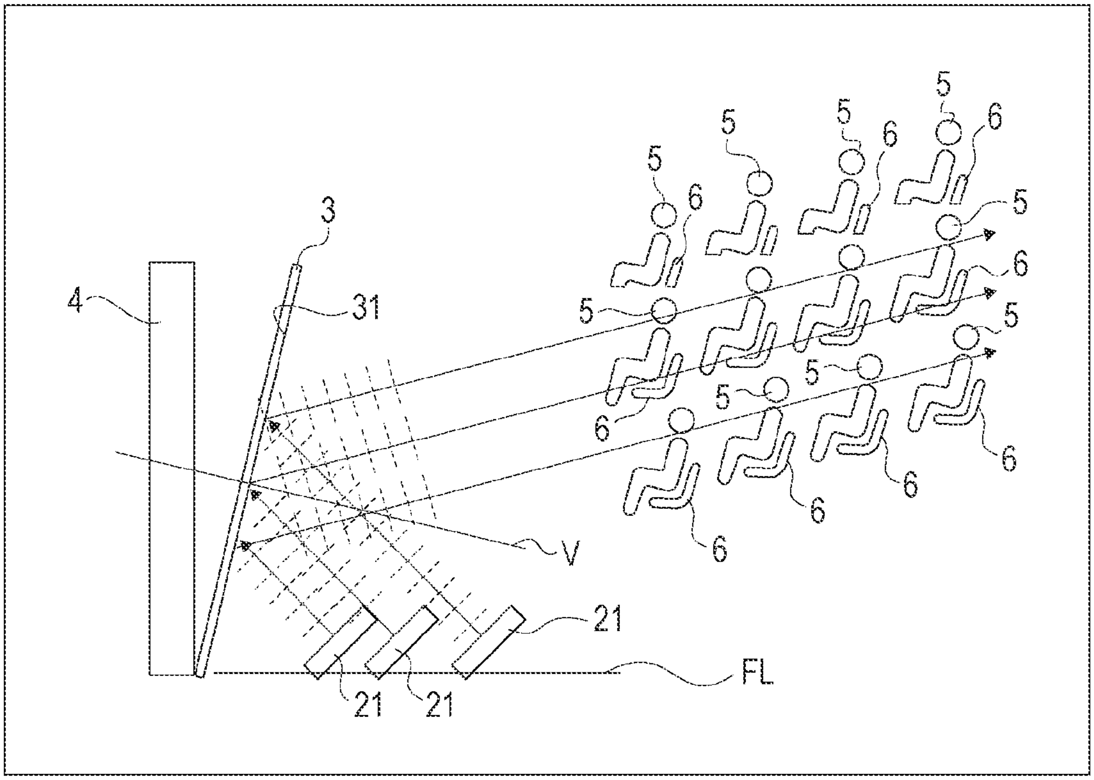
FIG. 5 is an explanatory diagram of enlargement of a sound image localization service area in a height direction.

FIG. 5 is an explanatory diagram of enlargement of the sound image localization service area AL in the height direction.

As illustrated in the drawing, the plurality of plane wave speakers 21 is arranged, and the plane wave speakers 21 emit plane waves toward different height positions on the sound reflecting surface 31. That is, the plane waves from the plane wave speakers 21 are reflected at different positions in the height direction of the sound reflecting surface 31. In the drawing, the plurality of plane wave speakers 21 is arranged in the front-rear direction, and the plane wave speakers 21 emit the plane waves at the same emission angle Q, so that the plane waves from the plane wave speakers 21 are reflected at different positions in the height direction of the sound reflecting surface 31.

Therefore, the sound image localization service area AL can be enlarged in the height direction.

Figure 6:
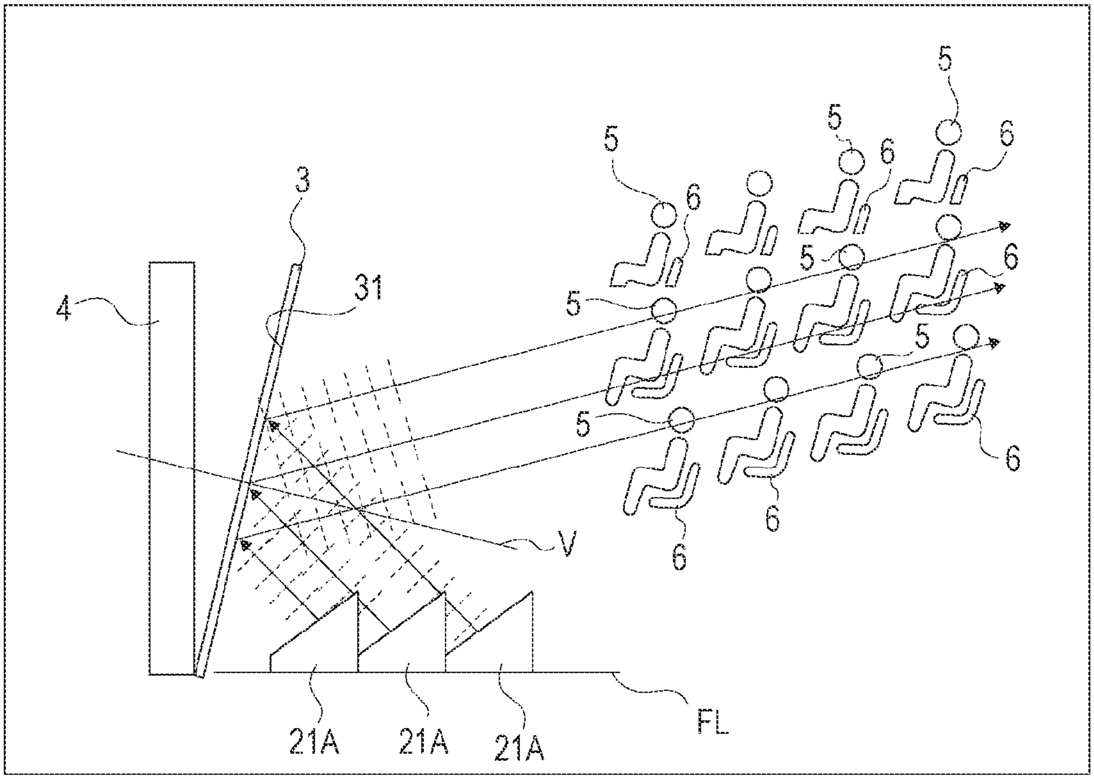
FIG. 6 is an explanatory diagram of a modification of the plane wave speaker.
Figure 7:
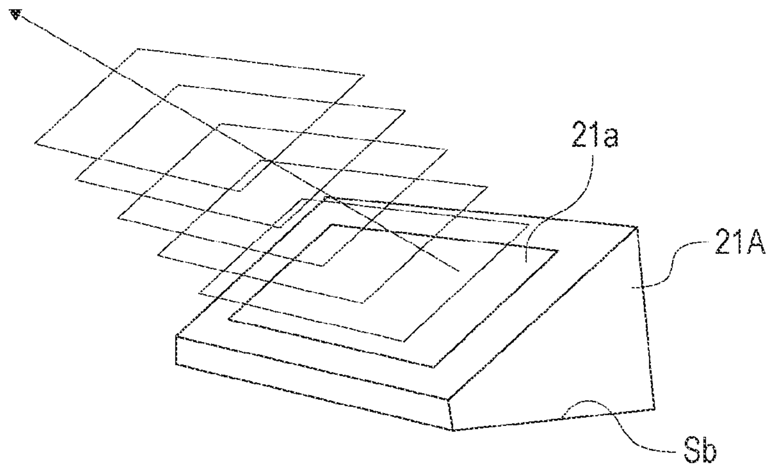
FIG. 7 is also an explanatory diagram of the modification of the plane wave speaker.

FIGS. 6 and 7 are diagrams for explaining a plane wave speaker 21A as a modification.

As shown in FIG. 7, the plane wave speaker 21A has a structure in which a diaphragm 21*a* that emits a plane wave is disposed non-parallel to a bottom surface 21*b*. With such a structure, it is easy to increase volume on a back side of the diaphragm 21*a* in a case where it is assumed that a plane wave is emitted in an oblique direction as illustrated in FIG. 6. Therefore, it is easy to expand a reproducible band to a low frequency side.

Figure 8:
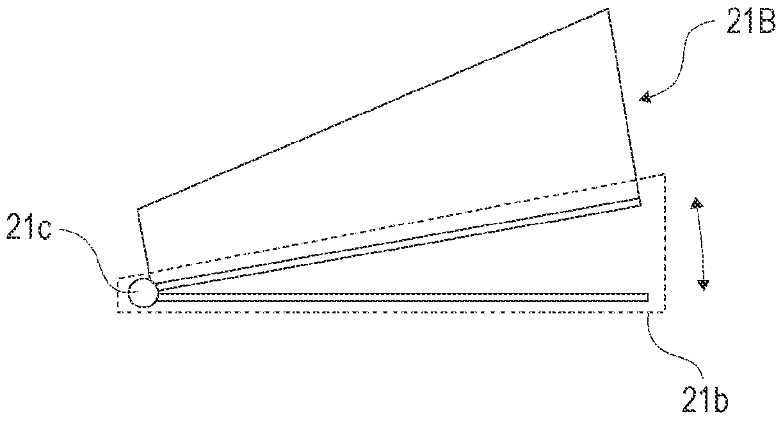
FIG. 8 illustrates a structure of a plane wave speaker in which a sound production direction is mechanically adjustable.

FIG. 8 is a diagram illustrating a structure of a plane wave speaker 21B in which a sound production direction can be mechanically adjusted.

FIG. 8 exemplifies the plane wave speaker 21B including an angle adjustment unit 21*b* that supports a speaker main body having a diaphragm so as to be rotatable about a shaft 21*c*. With such an angle adjustment unit 21*b*, an inclination angle of the speaker main body (inclination angle with respect to the horizontal direction) can be adjusted, and the sound production direction can be adjusted.

In the above description, a case has been exemplified where the plane wave speaker configured to be capable of outputting the plane wave alone (that is, the speaker as a plane sound source) is used as a sound producing unit that emits a plane wave (directional sound). Instead of this, as a sound producing device 2A illustrated in FIG. 9, a plane wave can be emitted in a specific direction using a speaker array 28 in which a plurality of point sound source speakers 28*a* is arranged one-dimensionally or two-dimensionally.

As is well known, by using the speaker array 28, it is possible to control directivity of a sound by using delay processing of an audio signal to be reproduced by the point sound source speakers 28*a* and a wavefront synthesis technique for sound waves emitted by the point sound source speakers 28*a*. That is, an emission angle of the plane wave can be adjusted.

The sound producing device 2A includes a plurality of amplifiers 25 for driving the point sound source speakers 28*a*, and an audio signal processing unit 29 that performs predetermined audio signal processing on the audio signal to be reproduced by the point sound source speakers 28*a* and outputs the processed audio signal to the corresponding amplifiers 25. The audio signal processing unit 29 performs delay processing or processing for wavefront synthesis for realizing the directivity control as described above on the input audio signal.

Here, in a case where the plane wave is realized using the speaker array 28, there is a possibility that a sound emitted by the point sound source speaker 28*a* is leaked to the viewers 5 without passing through the sound reflecting surface 31. Therefore, in this case, it is desirable to arrange an acoustic shield 8 as illustrated in the drawing between the speaker array 28 and the viewers 5. As the acoustic shield 8, for example, it is desirable to use a member having a sound absorbing function. Furthermore, it is desirable that the acoustic shield 8 has a shape curved not on the viewer 5 side but on the speaker array 28 side as exemplified in the drawing, or the plate-shaped acoustic shield 8 is arranged to be inclined toward the speaker array 28 side in order to enhance a sound leakage preventing effect to the viewers 5.

Furthermore, in a case where the plane wave is realized using the speaker array 28, it is not necessary to provide a mechanism for mechanically adjusting an angle of a speaker when adjusting a sound production direction of the plane wave. In this case, the adjustment of the sound production direction of the plane wave can be realized by the audio signal processing by the audio signal processing unit 29 described above.

Figure 10:
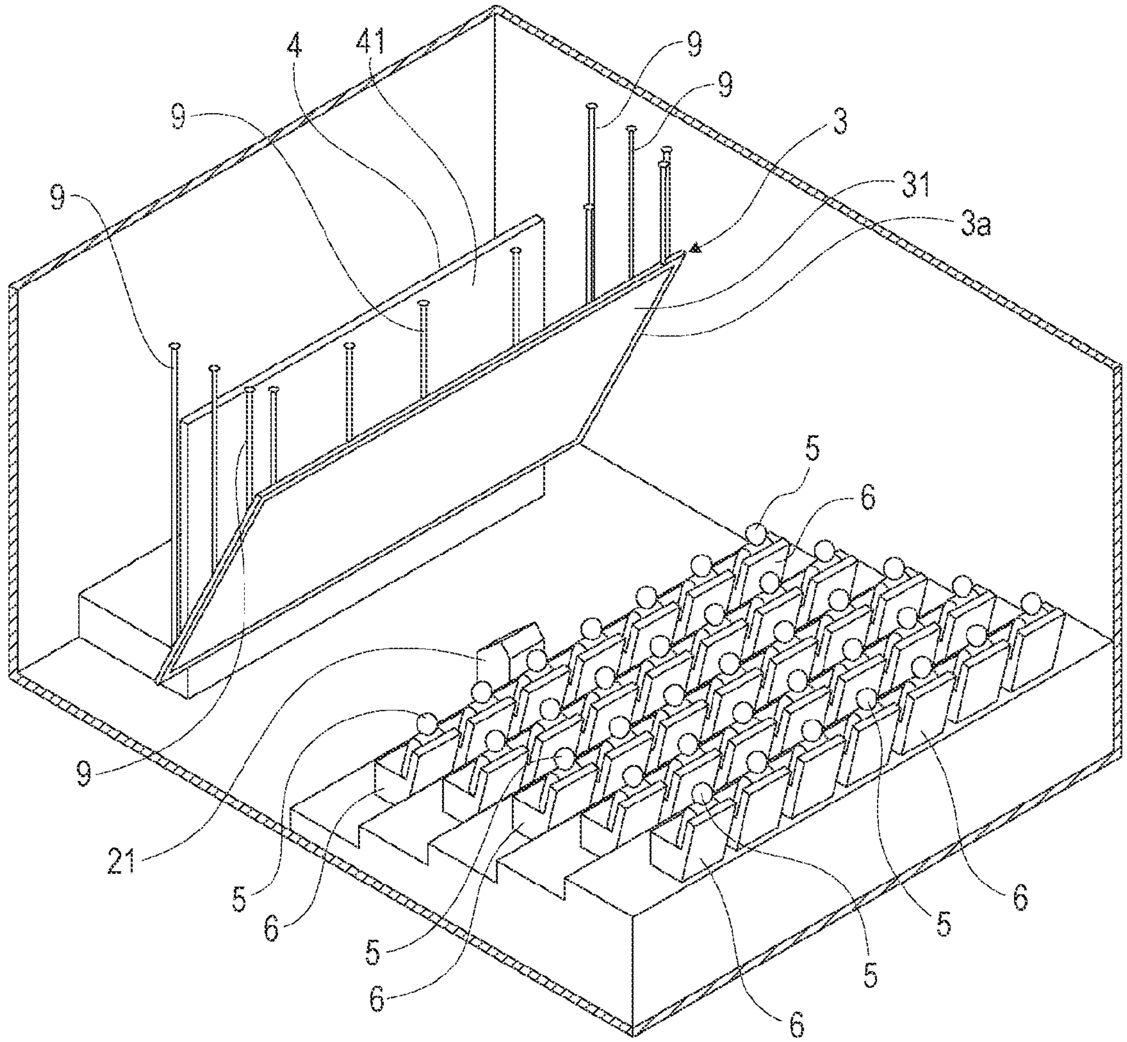
FIG. 10 is an explanatory diagram of a first example of a method of supporting a sound reflector.
Figure 11:
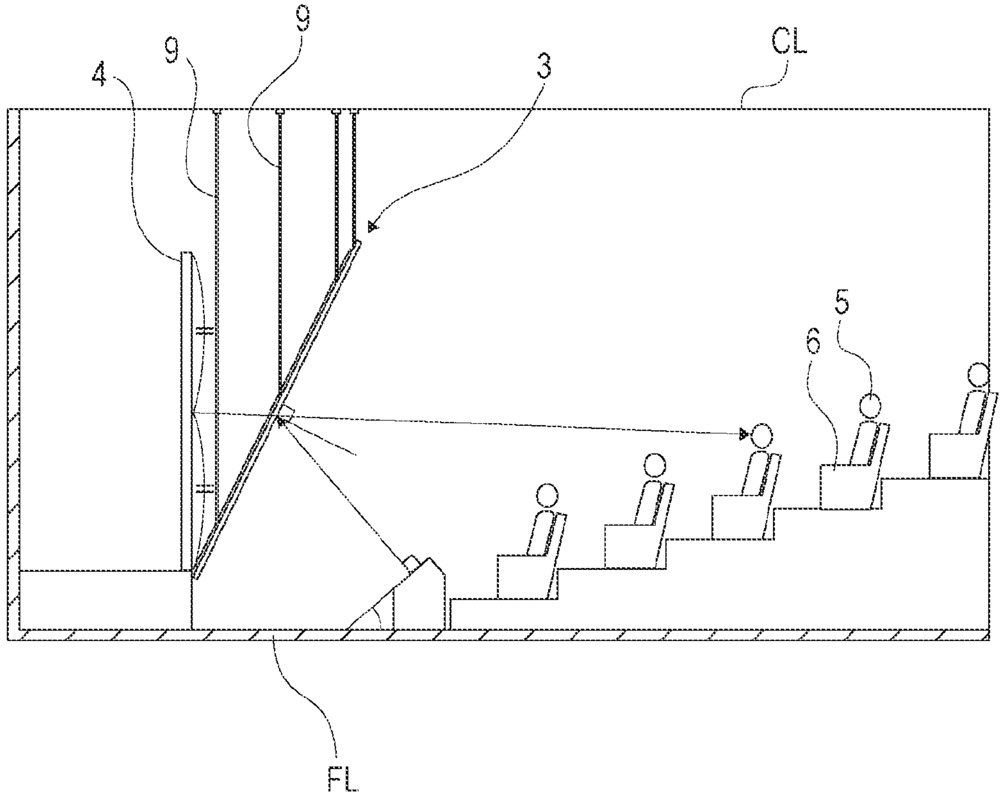
FIG. 11 is also an explanatory diagram of the first example of the method of supporting the sound reflector.

FIGS. 10 and 11 are explanatory diagrams of a first example of a method of supporting the sound reflector 3.

It is conceivable that the sound reflector 3 is supported by a suspension system from the ceiling CL as illustrated in the drawing. In this case, a frame 3*a* including, for example, metal and the like is formed at an edge of the sound reflector 3, and the sound reflector 3 is supported from the ceiling CL via a support member 9 including, for example, a metal wire and the like extending downward from the ceiling CL side at each of a plurality of portions of the frame 3*a*.

In the present example, since a large-screen display device is used as the display device 4, the size of the sound reflector 3 is also large, and weight thereof is also large. The suspension system is suitable for a case where the sound reflector 3 is large and heavy as described above.

Furthermore, the sound reflector 3 can be reinforced by providing the frame 3*a*. Moreover, by using a wire rod such as a metal wire as the support member 9, the support member 9 can be made inconspicuous, and a sense of immersion in viewing content can be improved.

Figure 12:
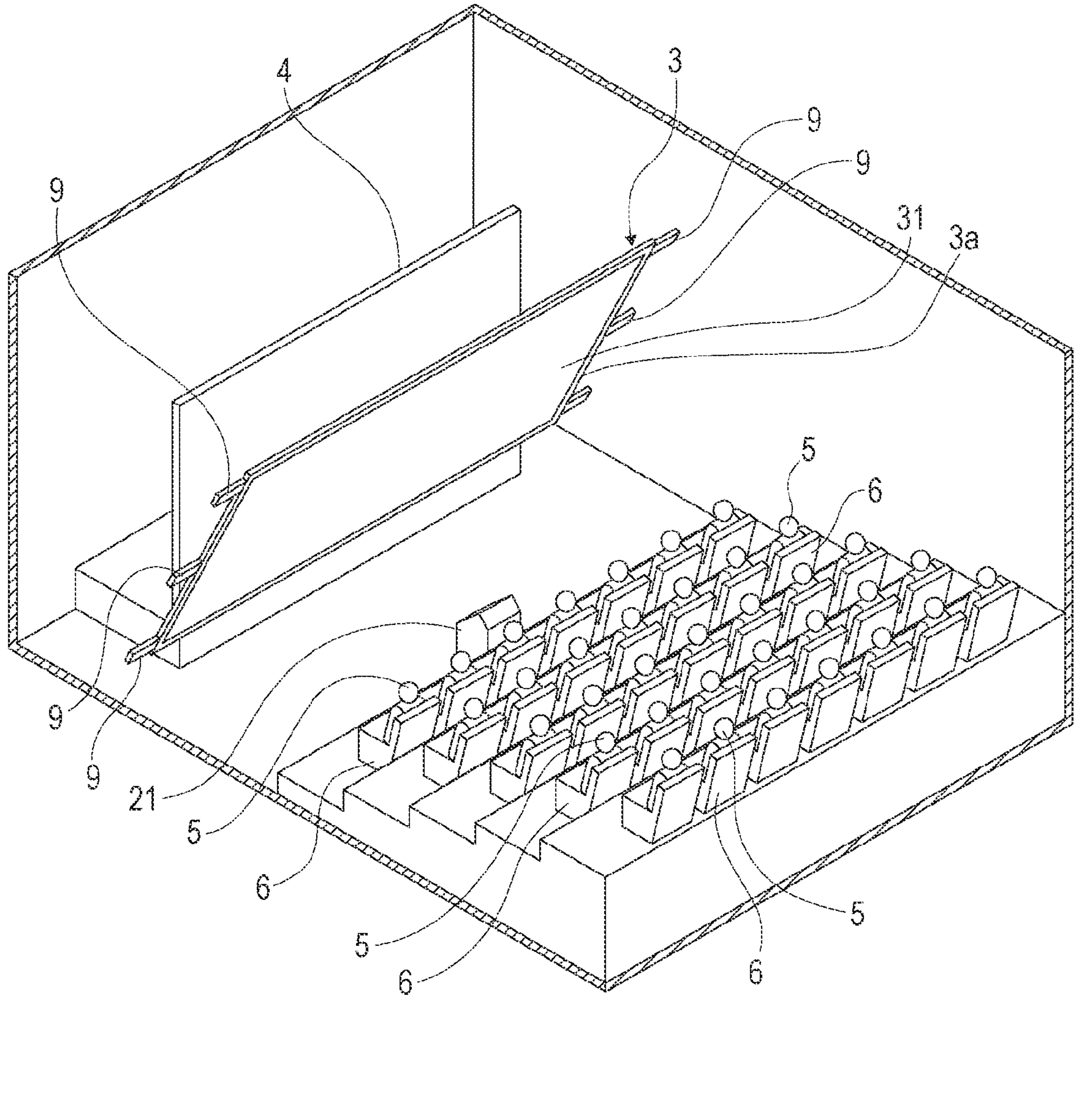
FIG. 12 is an explanatory diagram of a second example of the method of supporting the sound reflector.
Figure 13:
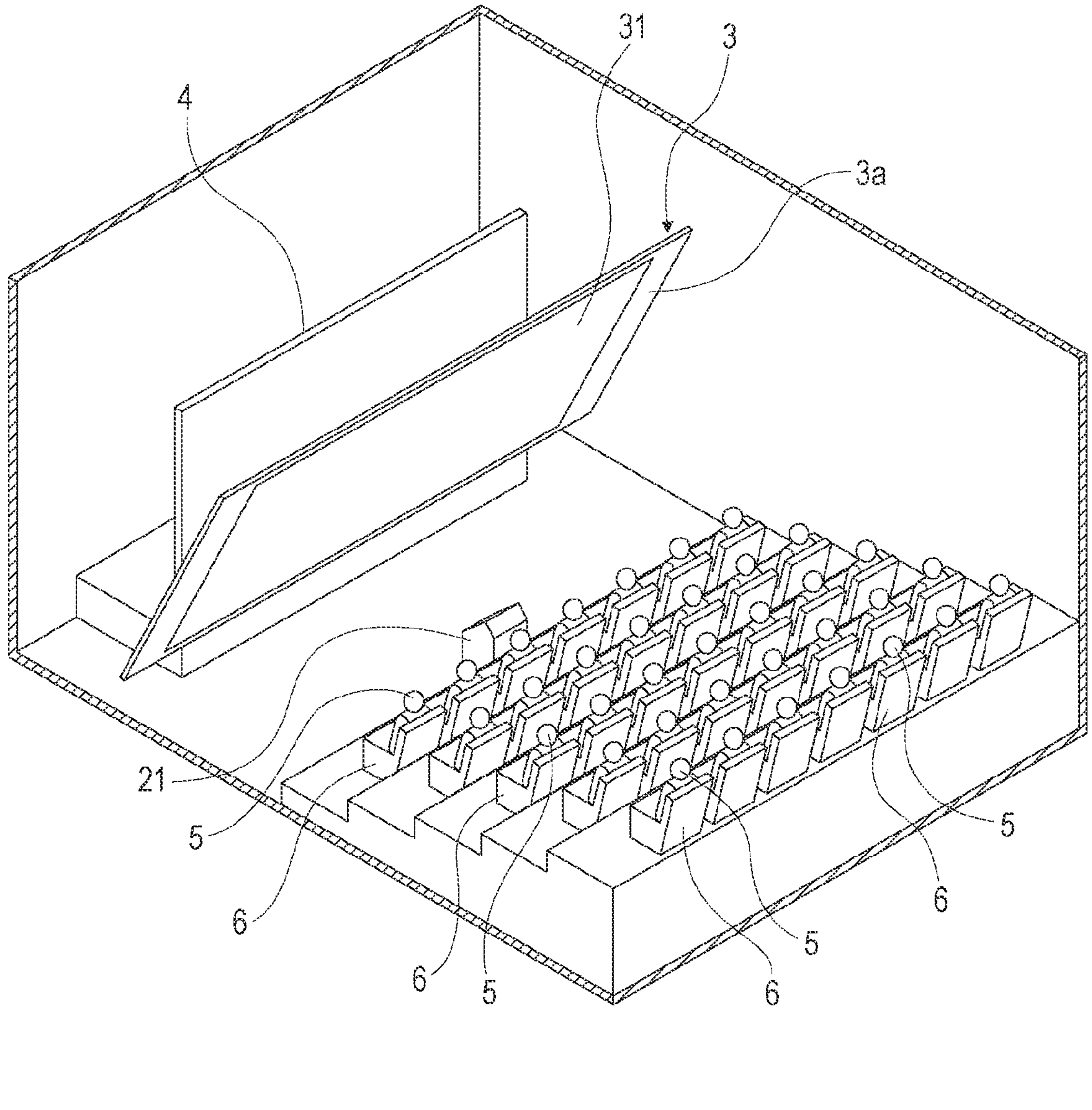
FIG. 13 is an explanatory diagram of a third example of the method of supporting the sound reflector.

Furthermore, the sound reflector 3 may be supported from side walls in a room as in a second example illustrated in FIG. 12 or a third example illustrated in FIG. 13. In the second example of FIG. 12, left and right side portions of the frame 3*a* are connected to left and right side walls via the plurality of support members 9, and in the third example of FIG. 13, the left and right side portions of the frame 3*a* are directly connected to the left and right side walls.

Figure 14:
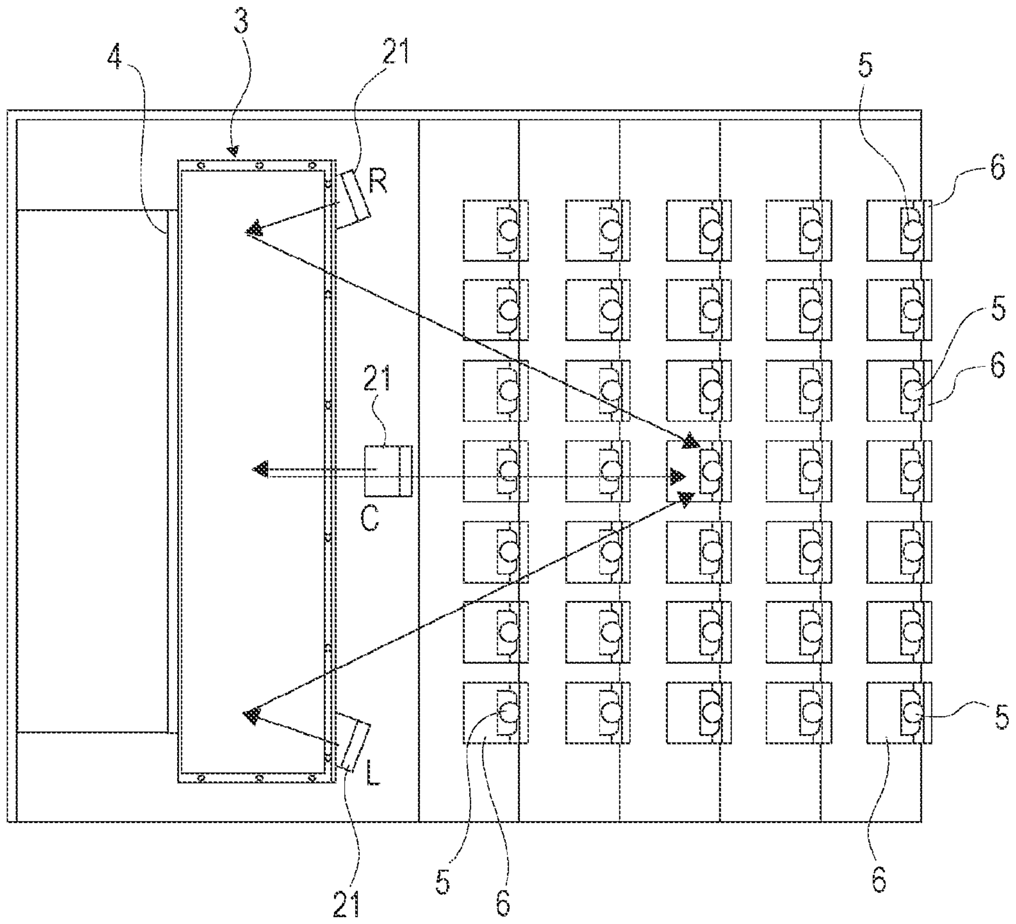
FIG. 14 is a diagram illustrating an example in which center (C), left (L), and right (R) speakers are arranged as an example corresponding to stereo reproduction.
Figure 15:
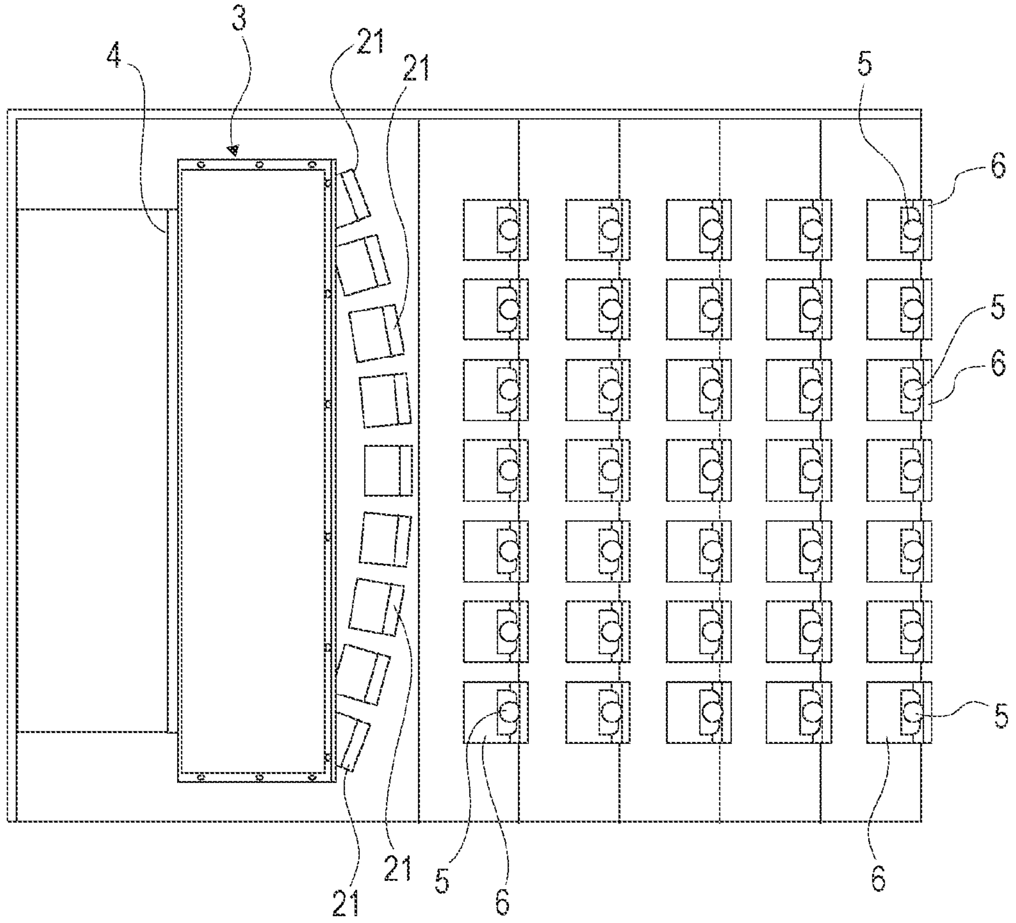
FIG. 15 is a diagram illustrating an example in which a plurality of plane wave speakers is arranged in a fan shape as an example corresponding to the stereo reproduction.
Figure 16:
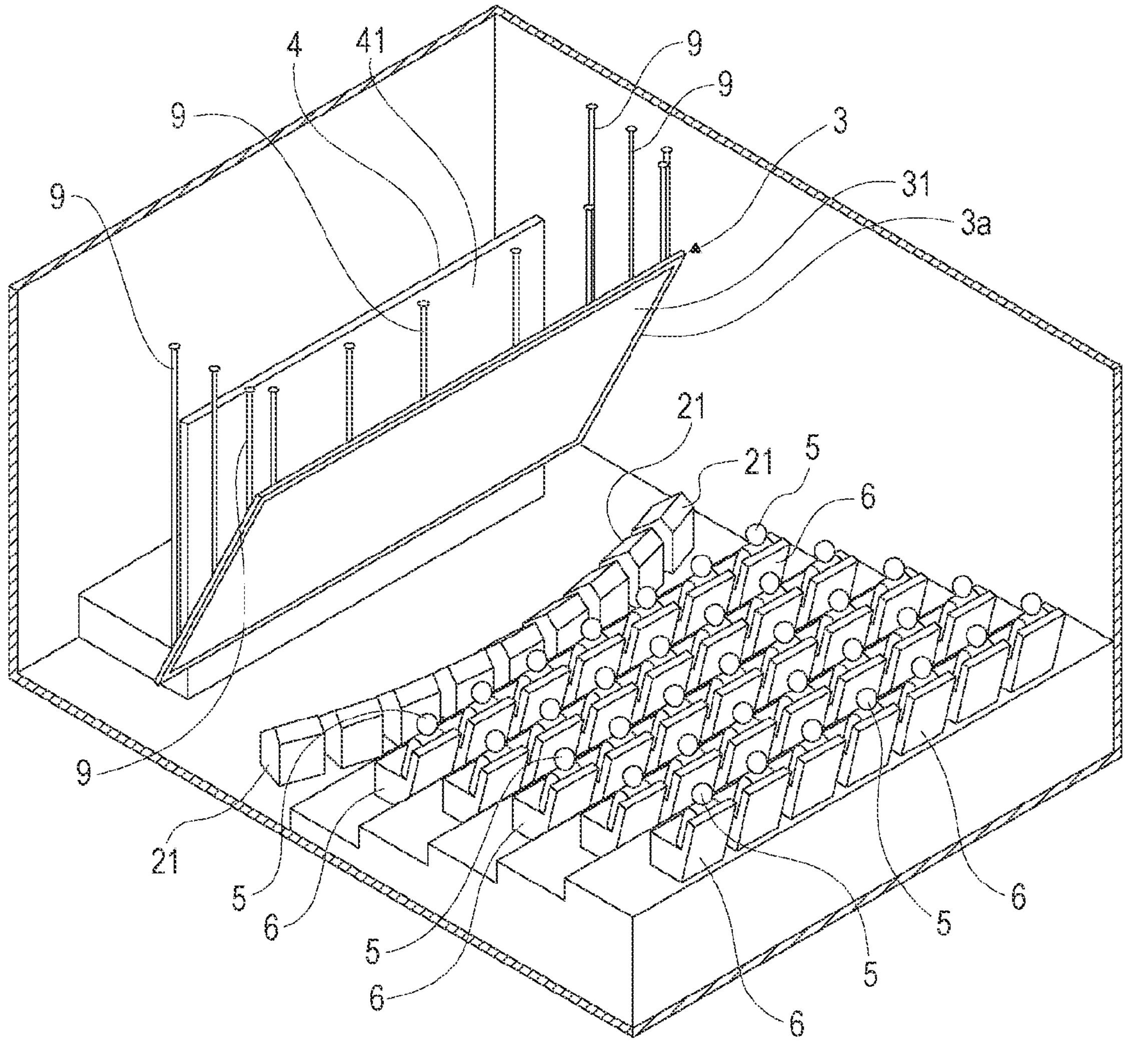
FIG. 16 is also a diagram illustrating an example in which the plurality of plane wave speakers is arranged in a fan shape as an example corresponding to the stereo reproduction.

FIGS. 14 to 16 are explanatory diagrams of examples corresponding to stereo reproduction.

In the above description, mainly substitution for the center speaker has been assumed, but localization of a sound image using reflection by the sound reflector 3 can also be realized for left (L) and right (R) speakers.

For example, in FIG. 14, the plane wave speaker 21 responsible for outputting a center sound indicated by “C” (hereinafter referred to as “21C”) is arranged at the center in the lateral direction. The plane wave speaker 21 responsible for outputting an R sound (hereinafter referred to as “21R”) and the plane wave speaker 21 responsible for outputting an L sound (hereinafter referred to as “21L”) are arranged on a right side (right side as viewed from the viewers 5) and a left side, respectively. In this case, as illustrated in the drawing, the plane wave speaker 21C has a plane wave emission direction coinciding with the front-rear direction, the plane wave speaker 21R has a plane wave emission direction inclined leftward with respect to the front-rear direction, and the plane wave speaker 21L has a plane wave emission direction inclined rightward with respect to the front-rear direction. Therefore, the viewer 5 positioned near the center in the lateral direction can hear the center sound from the center, the R sound from the right side of the center, and the L sound from the left side of the center.

Normally, in a case where stereo reproduction is performed, an Lch (channel) speaker and an Rch speaker are arranged at left and right ends of the display device 4, respectively. However, by adopting such a stereo reproduction method, it is possible to omit the speakers originally to be arranged at the left and right ends of the display device 4, and accordingly, it is possible to enlarge the display screen. Therefore, it is possible to contribute to effective use of a space and improvement of a design property.

FIGS. 15 and 16 illustrate examples in which the plurality of plane wave speakers 21 is arranged in a fan shape.

In these examples of FIGS. 15 and 16, the plurality of plane wave speakers 21 is arranged between the sound reflector 3 and the viewers 5 on an arc having a center on a rear side of the sound reflector 3, thereby realizing fan-shaped arrangement. In this case, among the plane wave speakers 21 arranged in the fan shape, the plane wave speaker 21 located at the center is used as the plane wave speaker 21C for outputting a center sound, the plane wave speaker 21 arranged on a right side thereof is used as the plane wave speaker 21R for outputting an R sound, and the plane wave speaker 21 arranged on a left side thereof is used as the plane wave speaker 21L for outputting an L sound. Specifically, the nine plane wave speakers 21 are arranged in the fan shape in the drawing, the three plane wave speakers 21 at the center are referred to as the plane wave speakers 21C, the three plane wave speakers 21 on the right side thereof are referred to as the plane wave speakers 21R, and the three plane wave speakers 21 on the left side thereof are referred to as the plane wave speakers 21L.

Therefore, a sound image localization service area AL in the lateral direction for the center sound, the R sound, and the L sound can be enlarged as compared with a case of FIG. 14.

In the above description, the examples have been described in which the plane wave is emitted from the floor FL side to the sound reflecting surface 31. However, as illustrated in FIG. 17, the plane wave can be emitted from the ceiling CL side.

Figure 17:
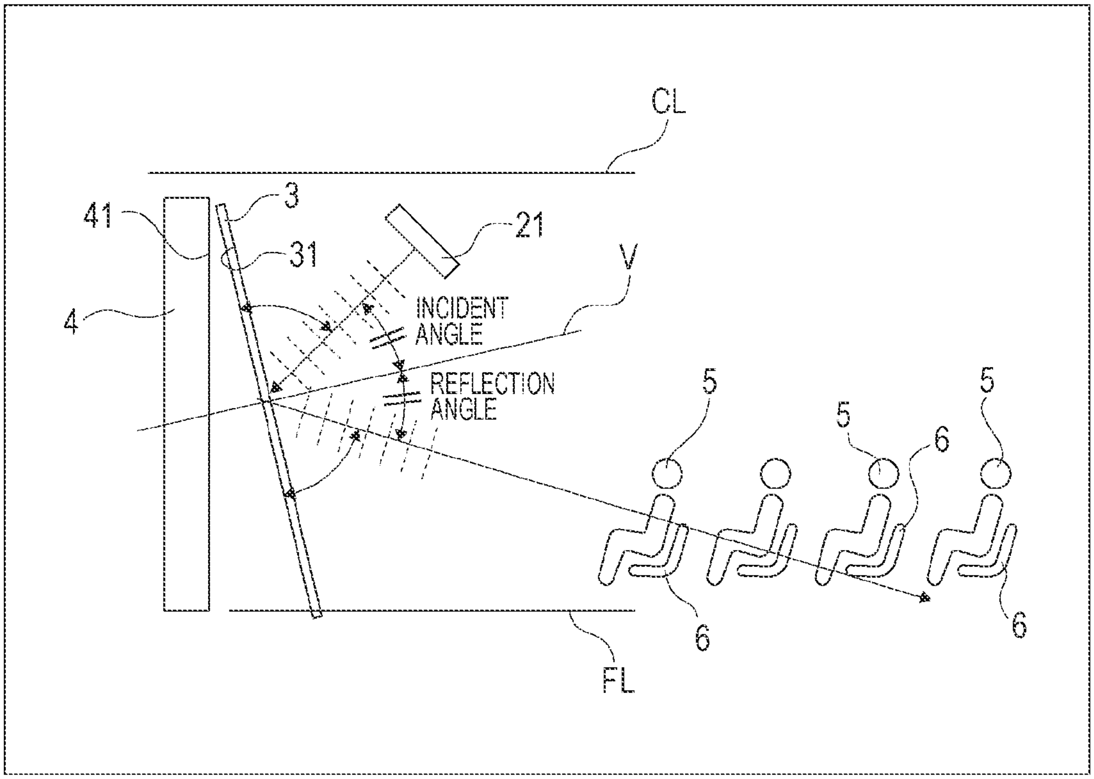
FIG. 17 is a diagram illustrating an example in which a plane wave is emitted from the plane wave speaker arranged in the vicinity of a ceiling.

FIG. 17 illustrates an example in which a plane wave is emitted from the plane wave speaker 21 arranged in the vicinity of the ceiling CL.

In a case where the plane wave is emitted from the ceiling CL side, if the sound reflector 3 is inclined forward, it is necessary to reduce an incident angle of the plane wave on the sound reflecting surface 31 in order to cause a reflected sound from the sound reflecting surface 31 to reach the vicinity of heads of the viewers 5. Therefore, it is necessary to arrange the plane wave speaker 21 considerably away from the sound reflector 3. In a case where the plane wave speaker 21 is arranged away from the sound reflecting surface 31, there is a possibility that sound pressure is significantly attenuated before reaching the viewers 5. Therefore, as illustrated in FIG. 17, it is desirable that the sound reflector 3 in this case is disposed in a backward inclined state (that is, disposed to be inclined toward the display device 4 side).

Figure 18:
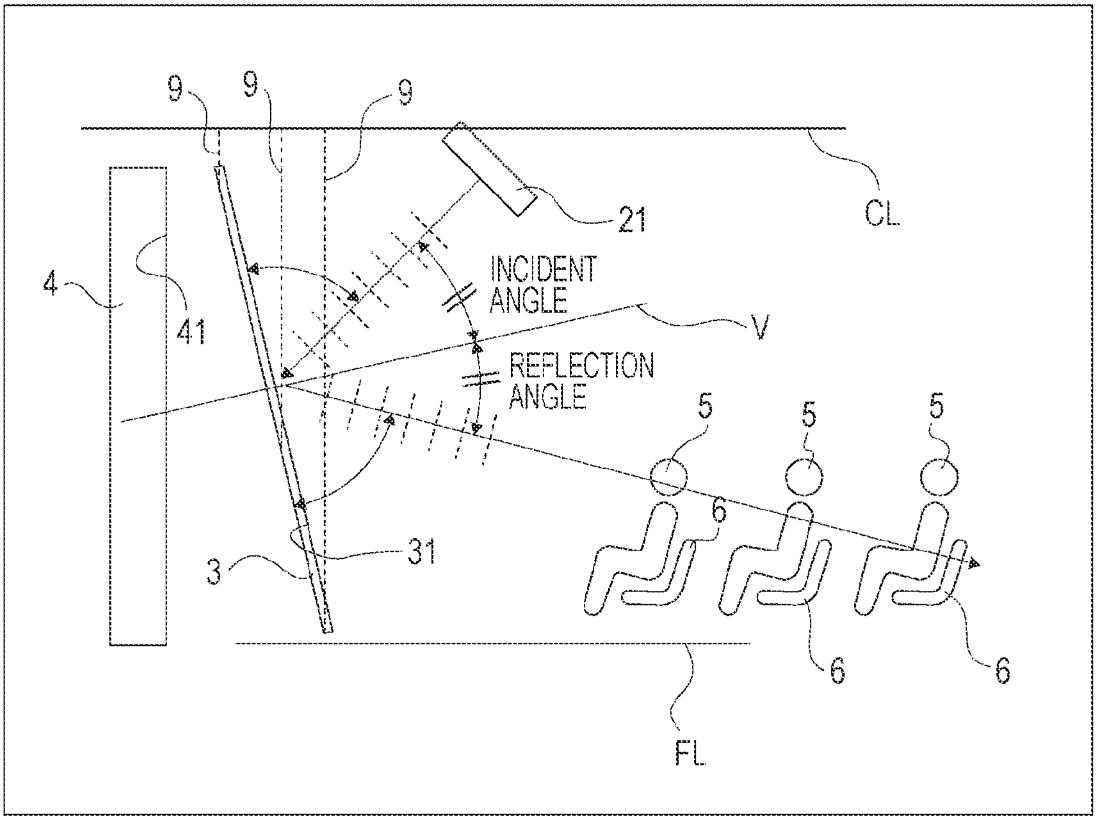
FIG. 18 is a diagram illustrating an example of a method for supporting the sound reflector in a backward inclined state.

FIG. 18 illustrates an example of a method for supporting the sound reflector 3 in a backward inclined state.

As illustrated in the drawing, it is conceivable that the sound reflector 3 in the backward inclined state is also supported from the ceiling CL via the plurality of support members 9 by the suspension system. Note that, although not illustrated, the method of supporting the sound reflector 3 in the backward inclined state from the side wall as exemplified in FIGS. 12 and 13 can also be adopted.

Figure 19:
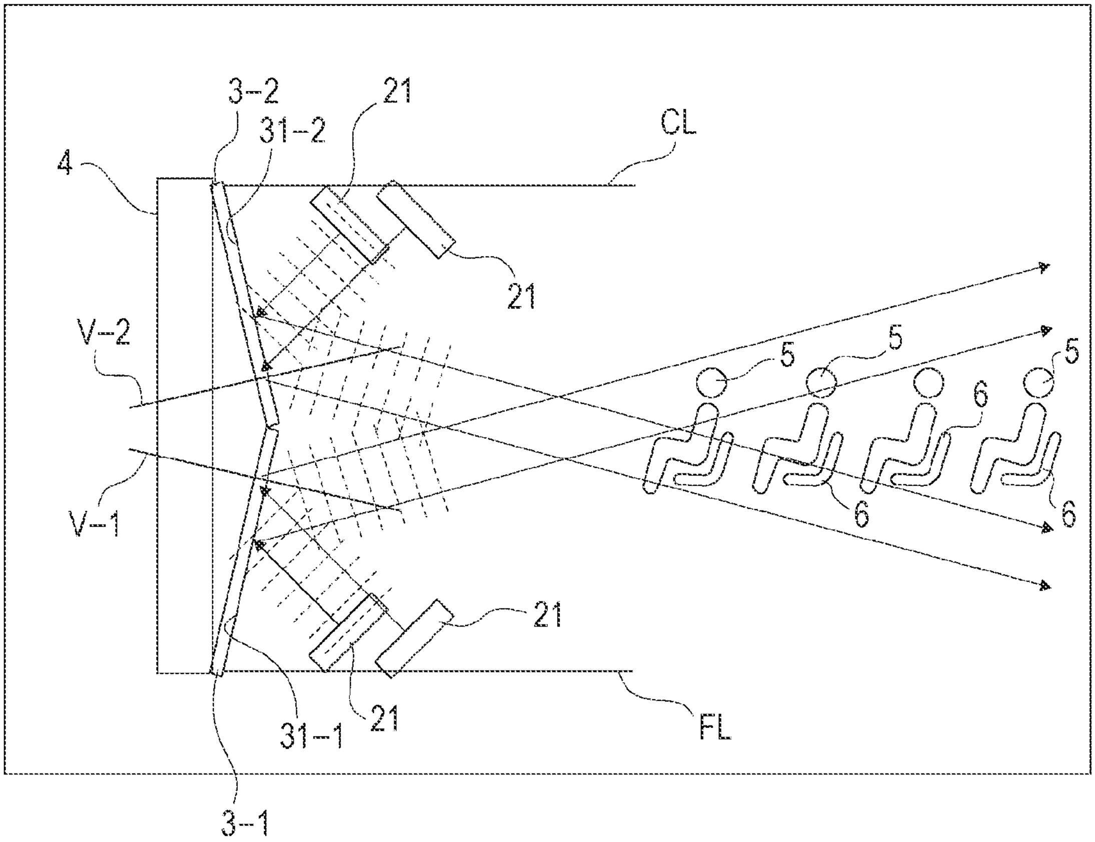
FIG. 19 is an explanatory diagram of a method of emitting plane waves from a floor side to one of two sound reflecting surfaces having different inclination angles and from a ceiling side to another thereof.

Here, it is also possible to output plane waves as illustrated in FIG. 19 by combining a method of emitting a plane wave from the floor FL side and a method of emitting a plane wave from the ceiling CL side.

In the acoustic reproduction system 1 illustrated in FIG. 19, a sound reflector 3-1 inclined forward for reflecting a plane wave emitted from the floor FL side and a sound reflector 3-2 inclined backward for reflecting a plane wave emitted from the ceiling CL side are provided as the sound reflector 3. In this case, a sound reflecting surface 31-1 of the sound reflector 3-1 and a sound reflecting surface 31-2 of the sound reflecting surface 31-2 have different inclination directions. Note that a perpendicular line V-1 to the sound reflecting surface 31-1 and a perpendicular line V-2 to the sound reflecting surface 31-2 are illustrated in the drawing.

FIG. 19 illustrates an example in which the plurality of plane wave speakers 21 is provided on each of the floor FL side and the ceiling CL side, the plane wave is emitted from each of the plane wave speakers 21 on the floor FL side to the sound reflecting surface 31-1, and the plane wave is emitted from each of the plane wave speakers 21 on the ceiling CL side to the sound reflecting surface 31-2. However, the number of plane wave speakers 21 disposed on each of the floor FL side and the ceiling CL side may be a single number.

As described above, by having a configuration in which the plane waves are emitted from the floor FL side and the ceiling CL side to the sound reflecting surface 31-1 and the sound reflecting surface 31-2, respectively, reflected sounds of the plane waves emitted from the floor FL side and the ceiling CL side can be vertically crossed in front of the viewers 5, as illustrated in the drawing. Therefore, natural sound spread from a sound source can be reproduced.

Furthermore, by adopting a configuration in which the plane waves are emitted from the floor FL side and the ceiling CL side to the sound reflecting surface 31-1 and the sound reflecting surface 31-2, respectively, for example, in a case where there are a first floor seat and a second floor seat as the seats 6, the reflected sound from the sound reflecting surface 31-1 can be delivered to the second floor seat and the reflected sound from the sound reflecting surface 31-2 can be delivered to the first floor seat by setting of sound production directions from the floor FL side and the ceiling CL side.

Note that, in the configuration illustrated in FIG. 19, in a case where image quality deterioration such as an image appearing distorted at a boundary portion between the sound reflector 3-1 and the sound reflector 3-2 and the like occurs, appropriate video signal processing for correcting this deterioration can also be performed.

Figure 20:
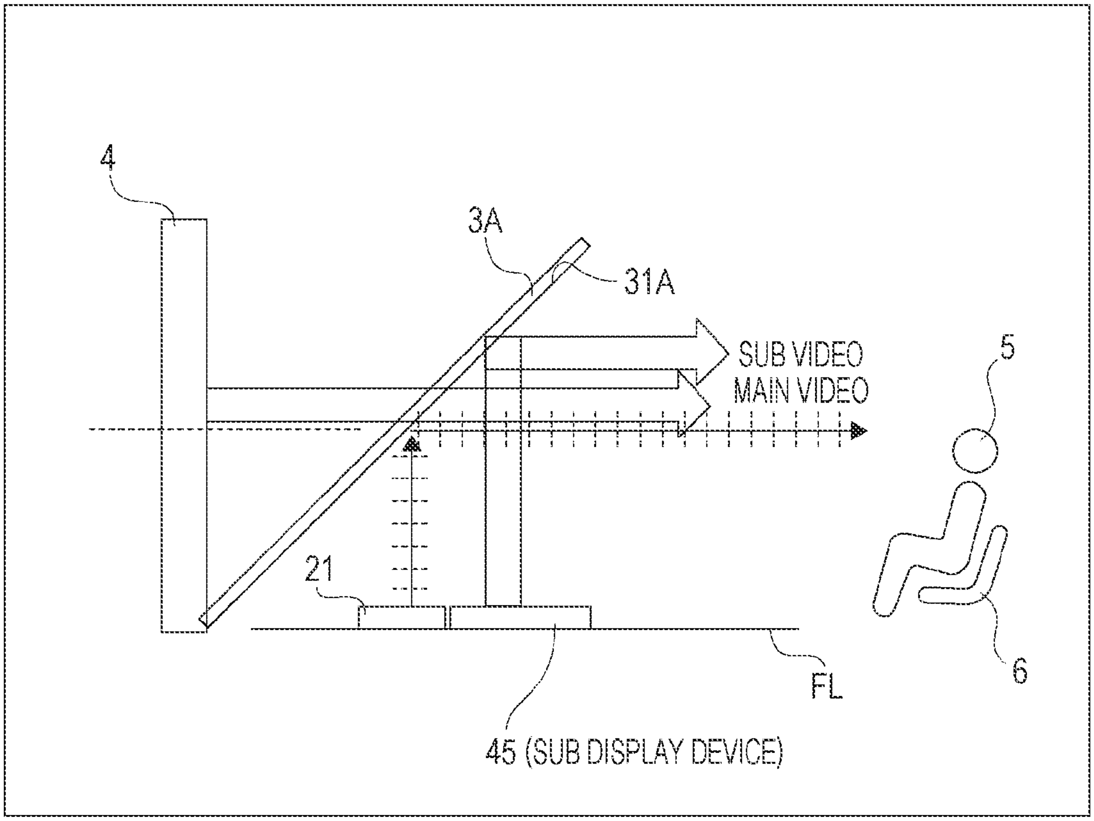
FIG. 20 is an explanatory diagram of a modification related to video display.

FIG. 20 is an explanatory diagram of a modification related to video display.

In the acoustic reproduction system 1 in this case, a sub display device 45 that outputs a sub video is provided in addition to the display device 4 that outputs a main video. Furthermore, a sound reflector 3A is provided instead of the sound reflector 3. The sound reflector 3A is different from the sound reflector 3 in that the sound reflector 3A includes a sound reflecting surface 31A including a half mirror.

In FIG. 20, the sound reflector 3A is inclined forward corresponding to arrangement of the plane wave speaker 21 on the floor FL side. In this case, the sub display device 45 is also arranged on the floor FL side, and the sub video is output to the sound reflecting surface 31A together with the plane wave.

With such a configuration, on the sound reflecting surface 31A located on a front side of the main video by the display device 4 as viewed from the viewer 5, it is possible to make the sub video appear by using the principle of the Pepper's ghost.

Therefore, it is possible to cause the viewer 5 to perceive localization of a sound image and a video that appears to be stereoscopically floating at a specific position on the sound reflecting surface 31A.

Note that a method of appearing the video by the principle of the Pepper's ghost using the sound reflecting surface 31A as described above can be similarly applied to the case of emitting a plane wave from the ceiling CL side as illustrated in FIG. 17 and the case of emitting a plane wave from both the floor FL side and the ceiling CL side as illustrated in FIG. 19.

Note that, in the above description, it is assumed that the sound reflector 3 covers the entire display surface 41 of the display device 4, but as illustrated in FIGS. 21 to 24, for example, the sound reflector 3 may cover only a part of the display surface 41.

Figure 21:
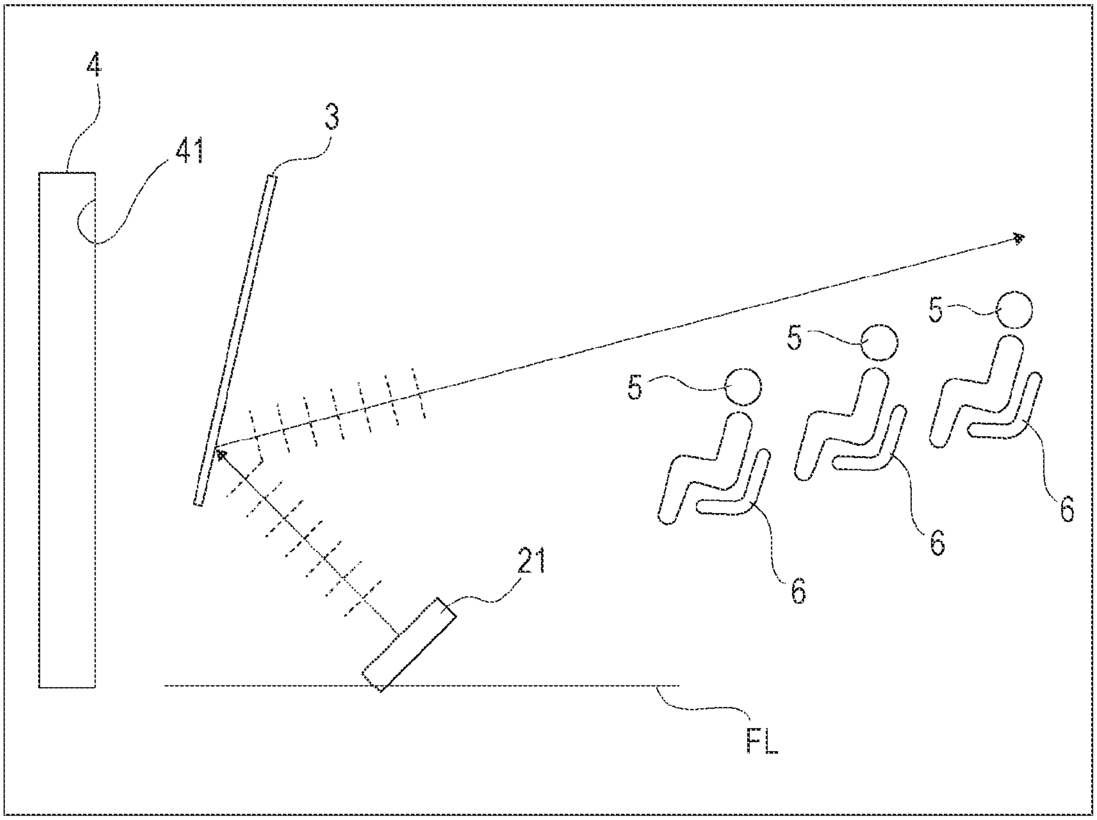
FIG. 21 is an explanatory diagram of an example in which the sound reflector covers only a part of a display surface.
Figure 22:
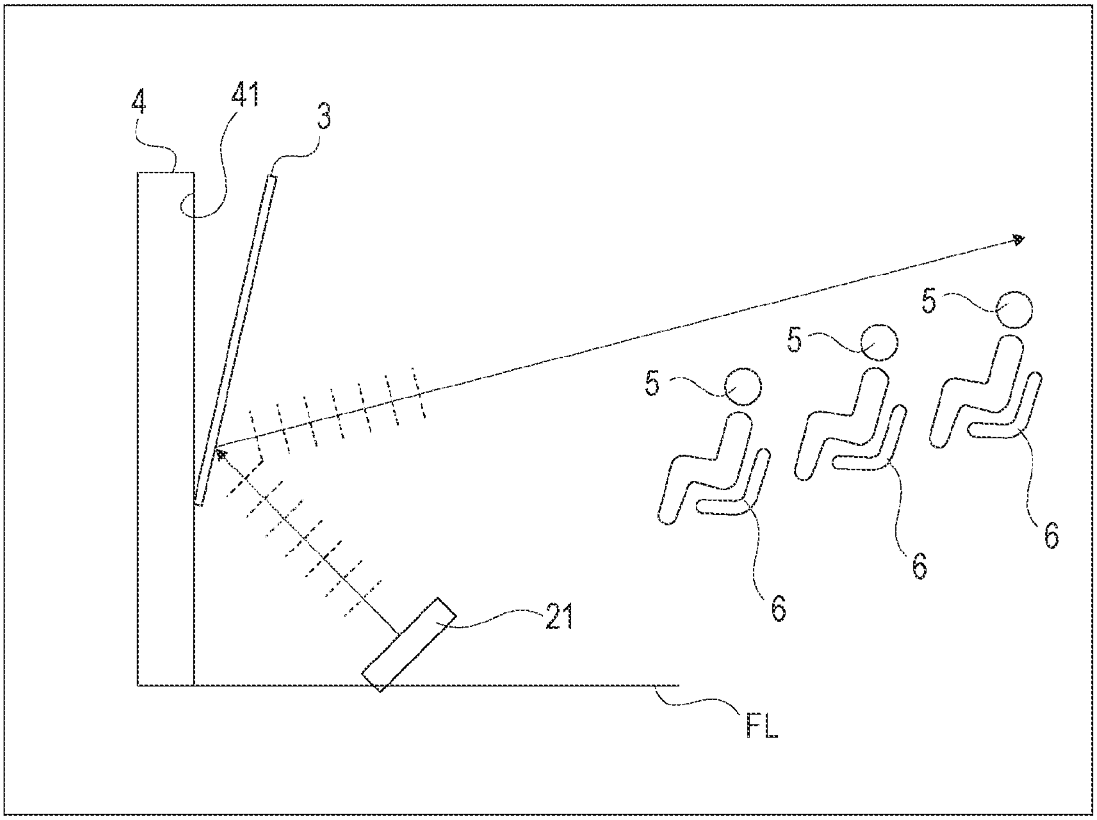
FIG. 22 is an explanatory diagram of another example in which the sound reflector covers only a part of the display surface.

FIGS. 21 and 22 illustrate configurations corresponding to a case where a plane wave is emitted from the floor FL side. FIG. 21 illustrates a case where the sound reflector 3 is arranged to be spaced forward from the display surface 41, and FIG. 22 illustrates a case where the sound reflector 3 abuts on the display surface 41 at a lower end.

Figure 23:
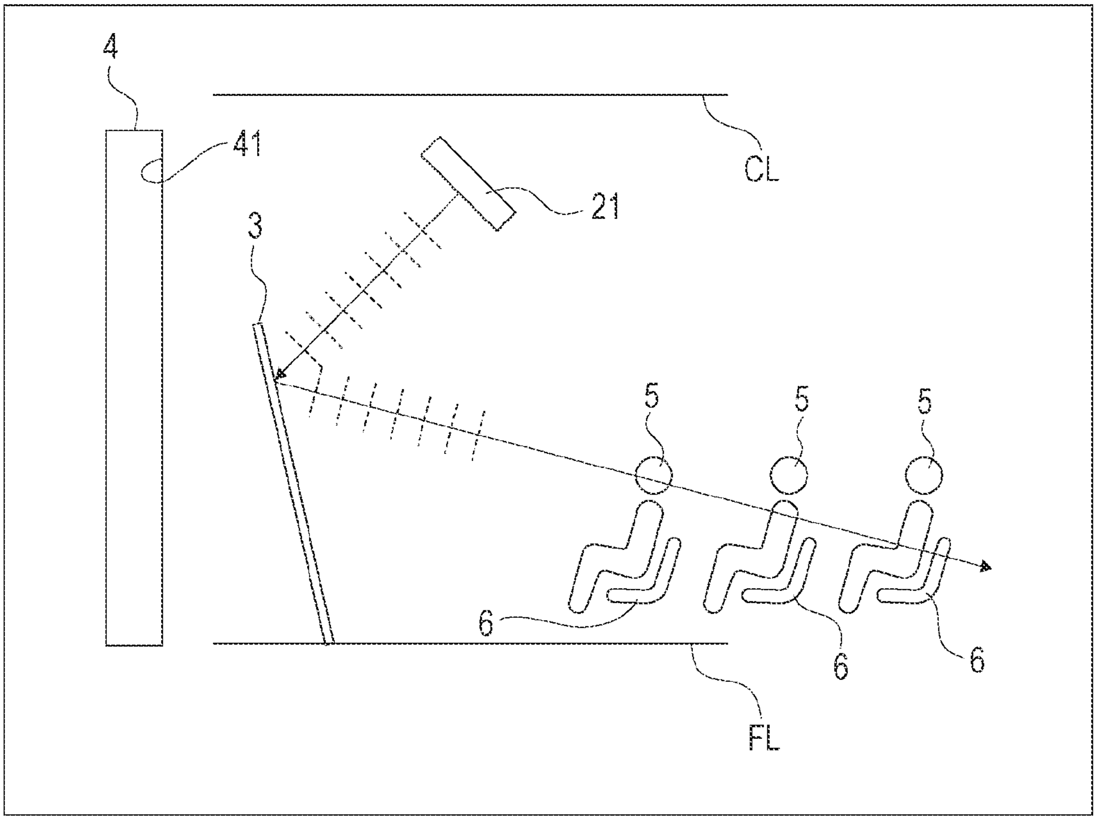
FIG. 23 is an explanatory diagram of another example in which the sound reflector covers only a part of the display surface.
Figure 24:
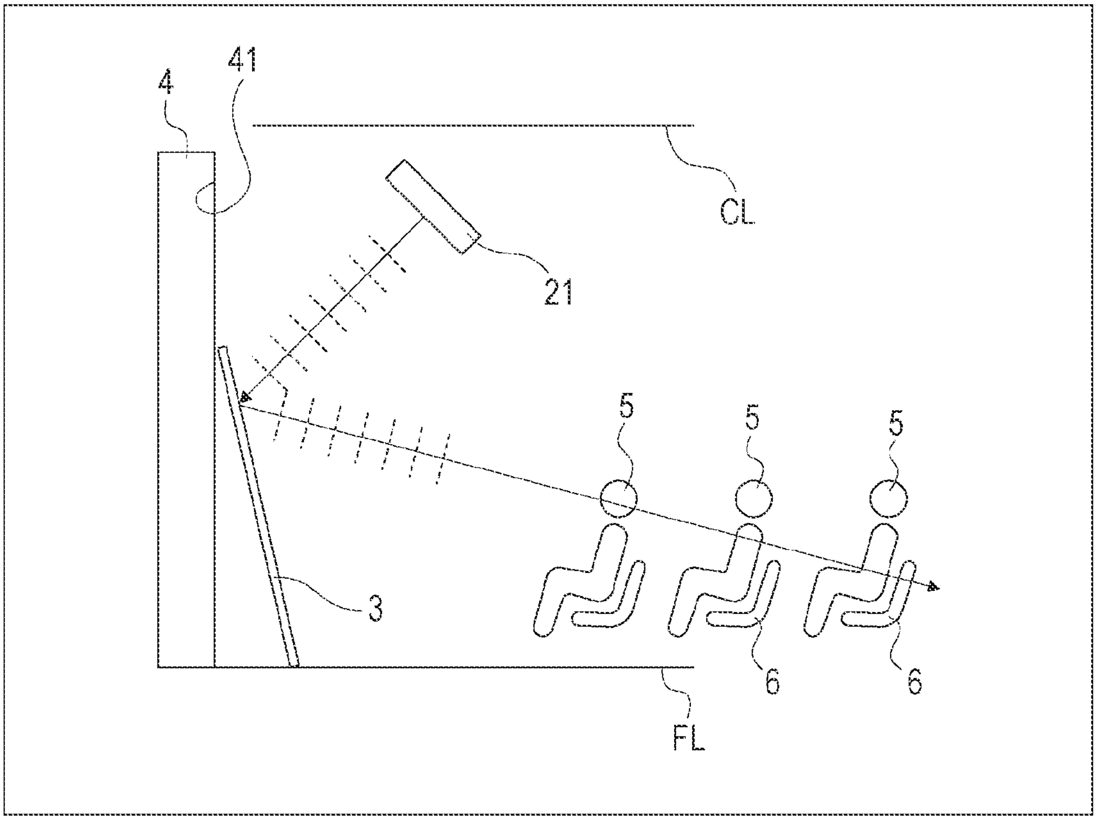
FIG. 24 is an explanatory diagram of still another example in which the sound reflector covers only a part of the display surface.

FIGS. 23 and 24 illustrate configurations corresponding to a case where a plane wave is emitted from the ceiling CL side. FIG. 23 illustrates a case where the sound reflector 3 is arranged to be spaced forward from the display surface 41, and FIG. 24 illustrates a case where the sound reflector 3 abuts on the display surface 41 at an upper end.

Here, there is a possibility that a difference in image quality is felt between a region where the sound reflector 3 is covered and a region where it is not covered as viewed from the viewers 5. However, in order to prevent such a difference in image quality from being felt, it is not essential that the sound reflector 3 covers the entire display surface 41.

Figure 25:
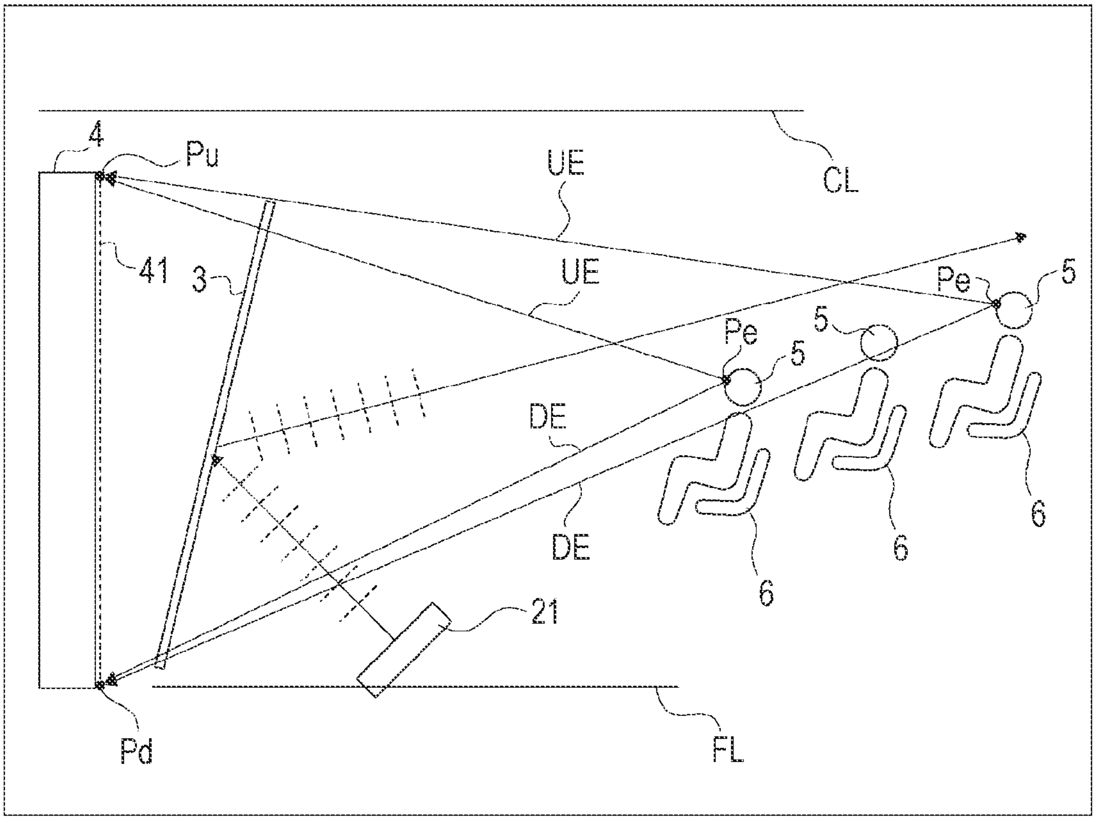
FIG. 25 is an explanatory diagram of a size condition of the sound reflector for preventing a difference in image quality from being felt.
Figure 26:
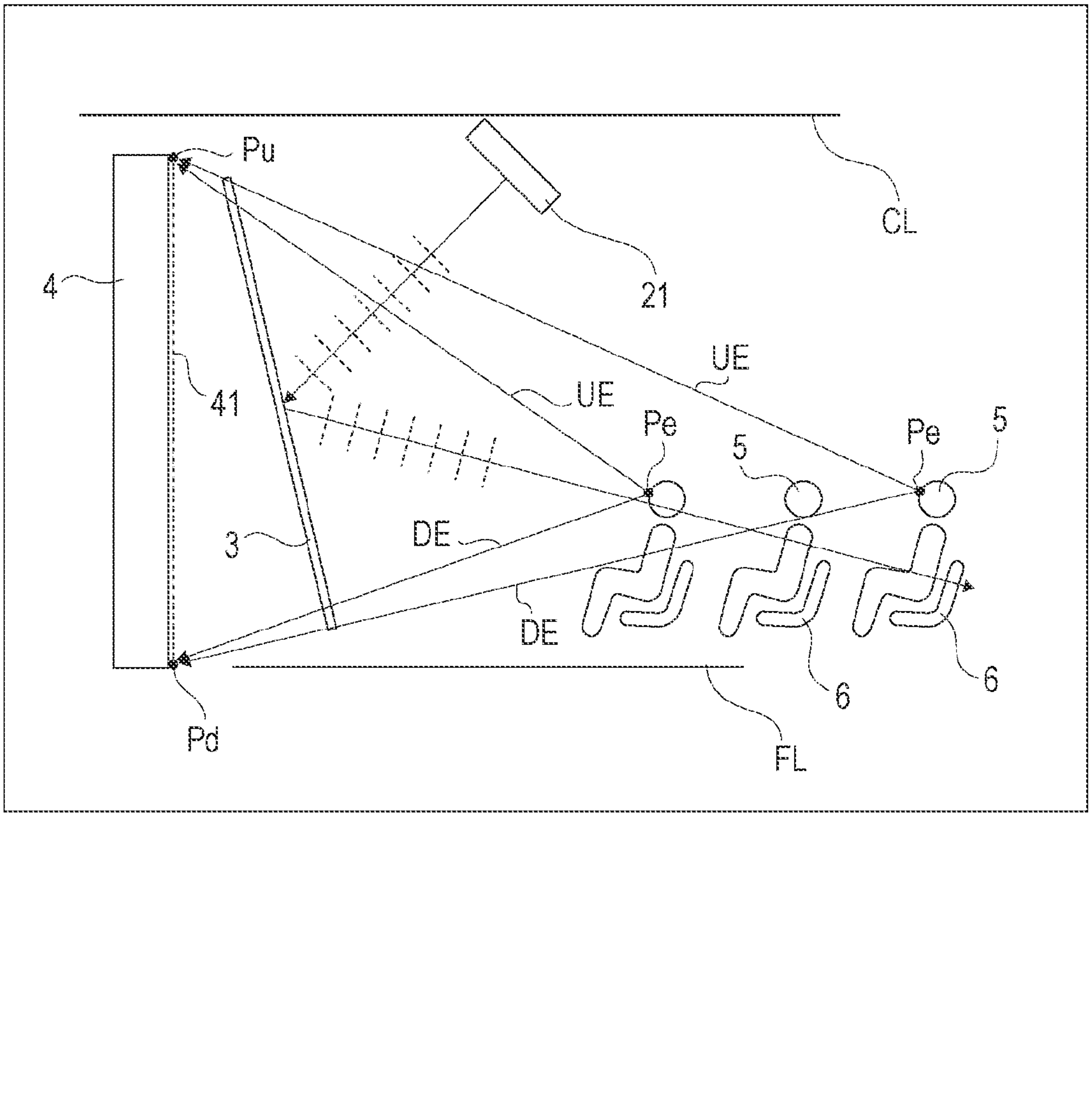
FIG. 26 is also an explanatory diagram of a size condition of the sound reflector for preventing the difference in image quality from being felt.

FIGS. 25 and 26 are explanatory diagrams of size conditions of the sound reflector 3 for preventing a difference in image quality from being felt. FIG. 25 illustrates arrangement of the sound reflector 3 in a case where a plane wave is emitted from the floor FL side, and FIG. 26 illustrates arrangement thereof in a case where a plane wave is emitted from the ceiling CL side. In order to prevent the difference in image quality, an upper end position of the sound reflector 3 is only required to be located above a straight line UE and a lower end position of the sound reflector 3 is only required to be located below a straight line DE, with reference to the straight line UE connecting a viewpoint position Pe of the viewer 5 and an upper end position Pu of the display surface 41 and a straight line DE connecting the viewpoint position Pe and a lower end position Pd of the display surface 41.

In FIG. 8 described above, a point of adjusting the sound production direction of the plane wave by adjusting the inclination angle of the plane wave speaker 21 by the angle adjustment unit 21*b* has been mentioned. Moreover, a point of adjusting the sound production direction of the plane wave by the audio signal processing in a case where the speaker array 28 is used has been mentioned. Here, adjustment of the reflection angle of the plane wave on the sound reflecting surface 31 can also be performed as adjustment of the inclination angle of the sound reflector 3.

Figure 27:
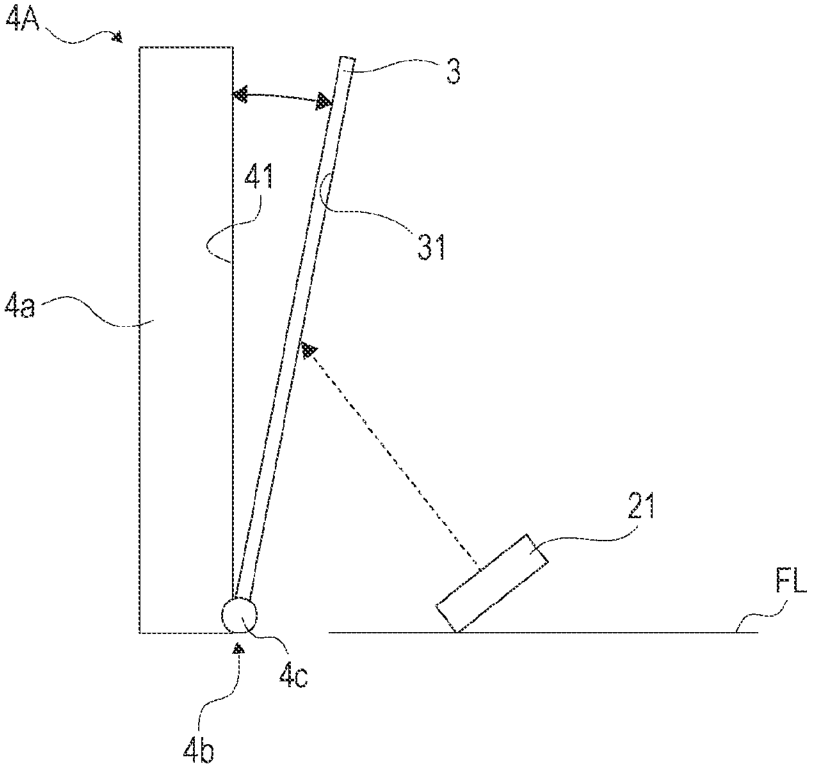
FIG. 27 is a diagram for describing a configuration example for adjusting an inclination angle of the sound reflector.

FIG. 27 is a diagram for describing a configuration example for adjusting the inclination angle of the sound reflector 3. In FIG. 27, as a configuration example corresponding to a case where a plane wave is emitted from the floor FL side by the plane wave speaker 21, a configuration of a display device 4A integrally including an angle adjustment unit 4*b* that adjusts the inclination angle of the sound reflector 3 is illustrated.

The display device 4A includes a main body 4*a* having the display surface 41 and the angle adjustment unit 4*b* integrally formed with the main body 4*a*. The angle adjustment unit 4*b* rotates the sound reflector 3 about a shaft 4*c* that supports a lower end of the sound reflector 3. Therefore, the inclination angle of the sound reflector 3 in a forward inclination direction can be adjusted. Furthermore, the sound reflector 3 can be in a state of being parallel to the display surface 41 (that is, an upright state: a state of the inclination angle=0 degrees). Here, the state in which the sound reflector 3 is parallel to the display surface 41 can be regarded as a state in which the sound reflector 3 is not protruded to the viewer 5 side, that is, a storage state.

In this case, the sound reflector 3 is integrated with the main body 4*a* via the angle adjustment unit 4*b*, and constitutes a part of the display device 4A.

Figure 28:
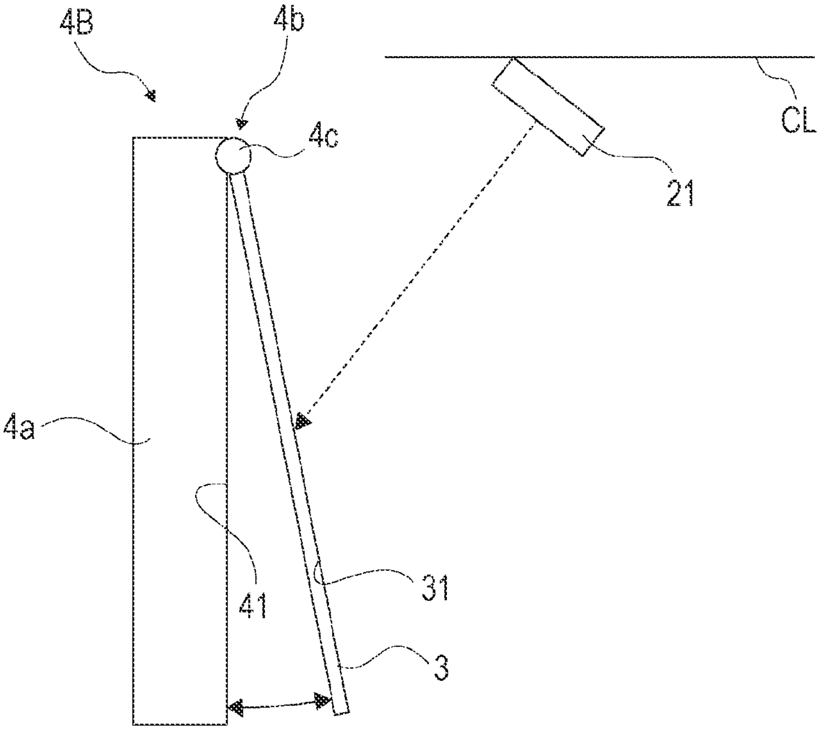
FIG. 28 is a diagram for explaining another configuration example for adjusting the inclination angle of the sound reflector.

FIG. 28 is a diagram for describing another configuration example for adjusting the inclination angle of the sound reflector 3, and specifically illustrates a configuration example of a display device 4B corresponding to a case where the plane wave speaker 21 emits a plane wave from the ceiling CL side.

A difference from the display device 4A illustrated in FIG. 27 is that the shaft 4*c* supports an upper end of the sound reflector 3. Therefore, the inclination angle of the sound reflector 3 in a backward inclination direction can be adjusted by the angle adjustment unit 4*b* in this case, and the sound reflector 3 can be brought into a state parallel to the display surface 41 (storage state).

By making the inclination angle of the sound reflector 3 adjustable, it is possible to adjust the sound image localization service area AL without adjusting the sound production direction of the directional sound on the sound producing device 2 side. Furthermore, by making the inclination angle of the sound reflector 3 adjustable, for example, when the acoustic reproduction system 1 is not used, the sound reflector 3 can be in the storage state parallel to the display surface 41.

Note that, although a case where the angle adjustment unit 4*b* is formed integrally with the display device 4 has been exemplified above, the angle adjustment unit 4*b* can be formed separately from the display device 4. Of course, in this case, the sound reflector 3 is separated from the display device 4.

Figure 9:
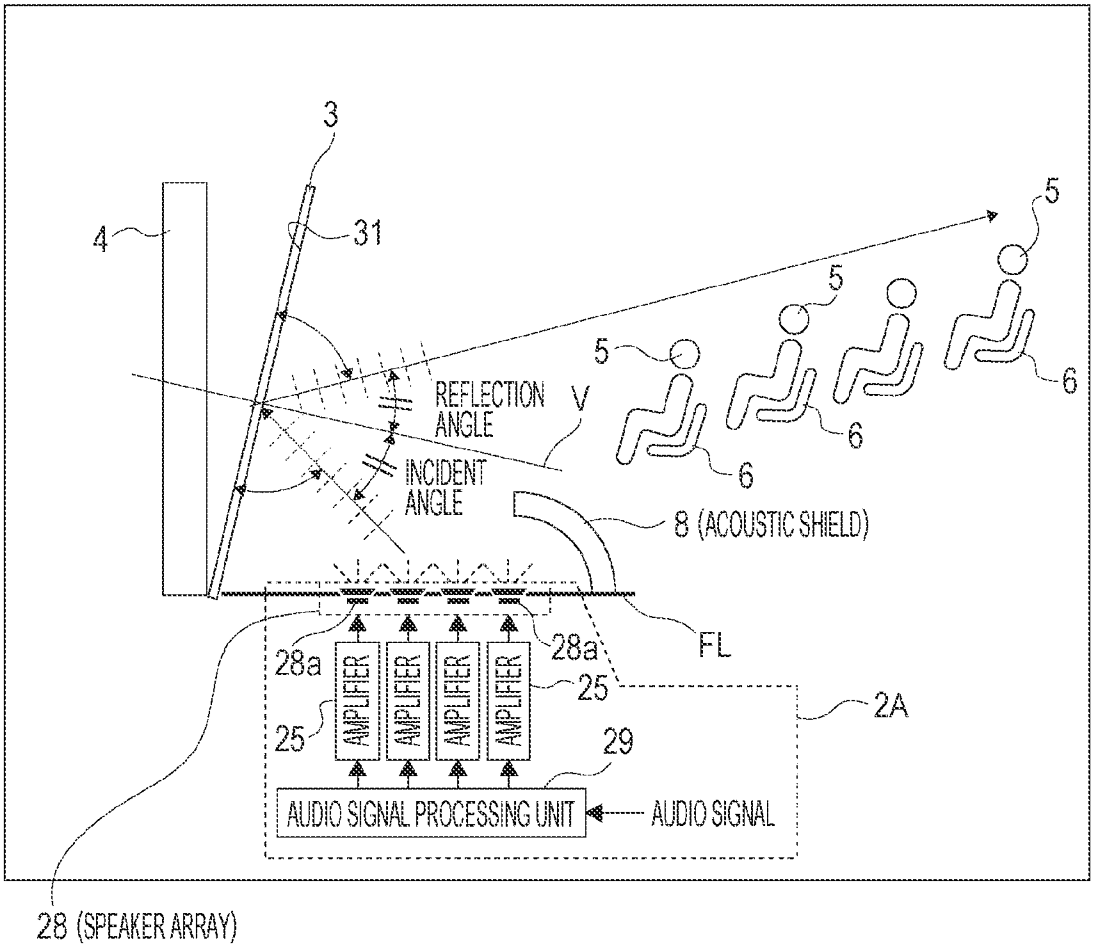
FIG. 9 is an explanatory diagram of an example of emitting a plane wave by a speaker array.

Here, in a case where the plane wave output using the speaker array 28 as exemplified in FIG. 9 above is performed, it is possible to realize sound image localization with movement by combination with an object audio technology.

Figure 29:
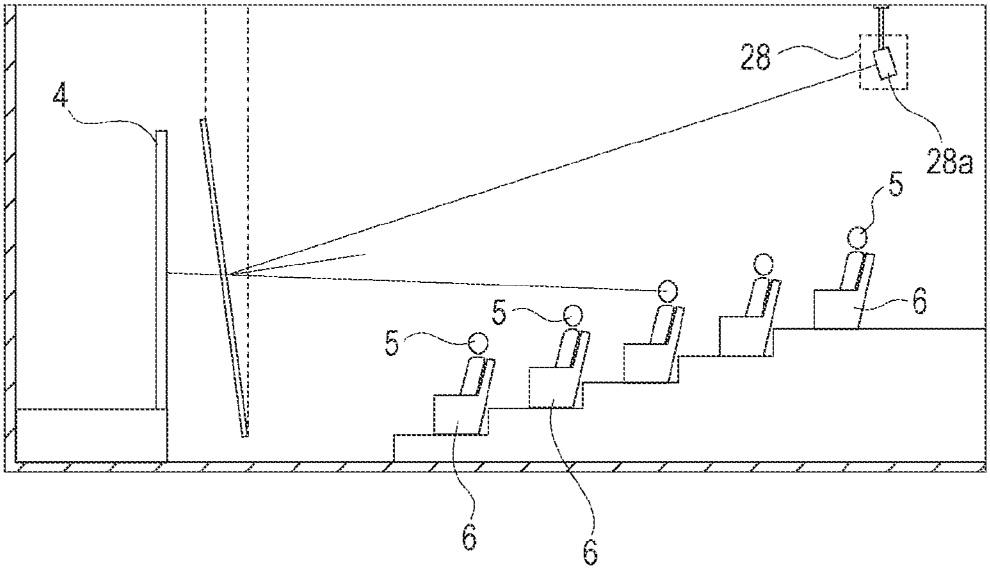
FIG. 29 is a diagram for explaining an example of a combination with an object audio technology.
Figure 30:
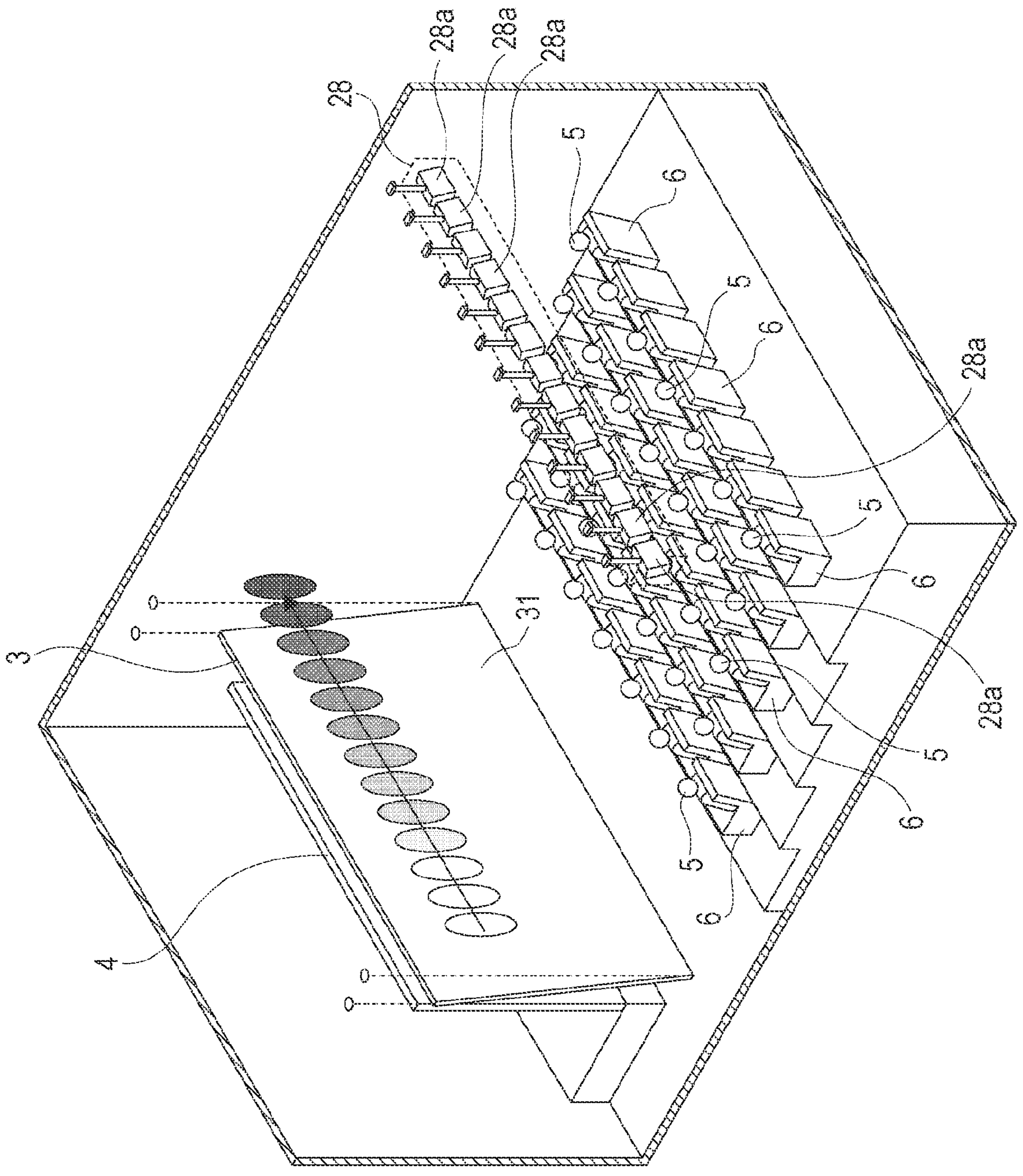
FIG. 30 is also a diagram for describing an example of the combination with the object audio technology.

For example, as illustrated in FIGS. 29 and 30, the plurality of point sound source speakers 28*a* constituting the speaker array 28 is arranged in the lateral direction. In this case, by performing the audio signal processing such as the delay described above and the like for controlling the direction of the plane wave on the basis of the object audio technology, movement of a sound image in the lateral direction can be perceived as an image of a sound image illustrated in FIG. 30. Note that, in a case where the plurality of point sound source speakers 28*a* is arranged in the vertical direction, movement of a sound image in the vertical direction can be perceived by combination with the object audio technology.

<2. Calibration>

For example, in an environment in which a relatively large number of seats 6 are provided and a large number of viewers 5 can view content to be viewed, such as a theater facility and the like, it is conceivable to adjust a position and size of the sound image localization service area AL according to, for example, a degree to which the viewers 5 enter and the like.

Figure 31A:
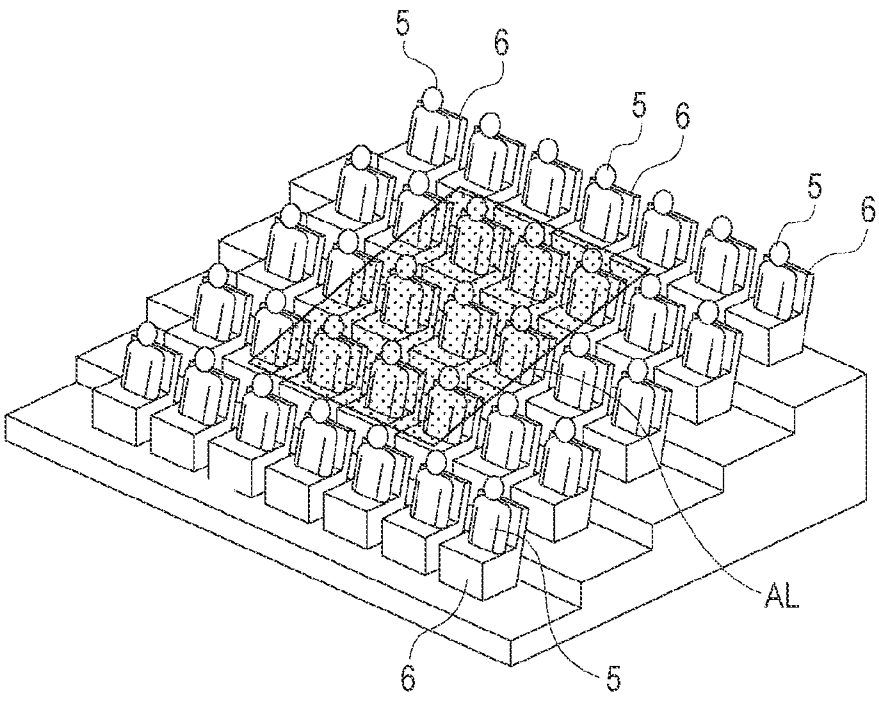
FIGS. 31A and 31B are explanatory diagrams of adjustment of the sound image localization service area.
Figure 31B:
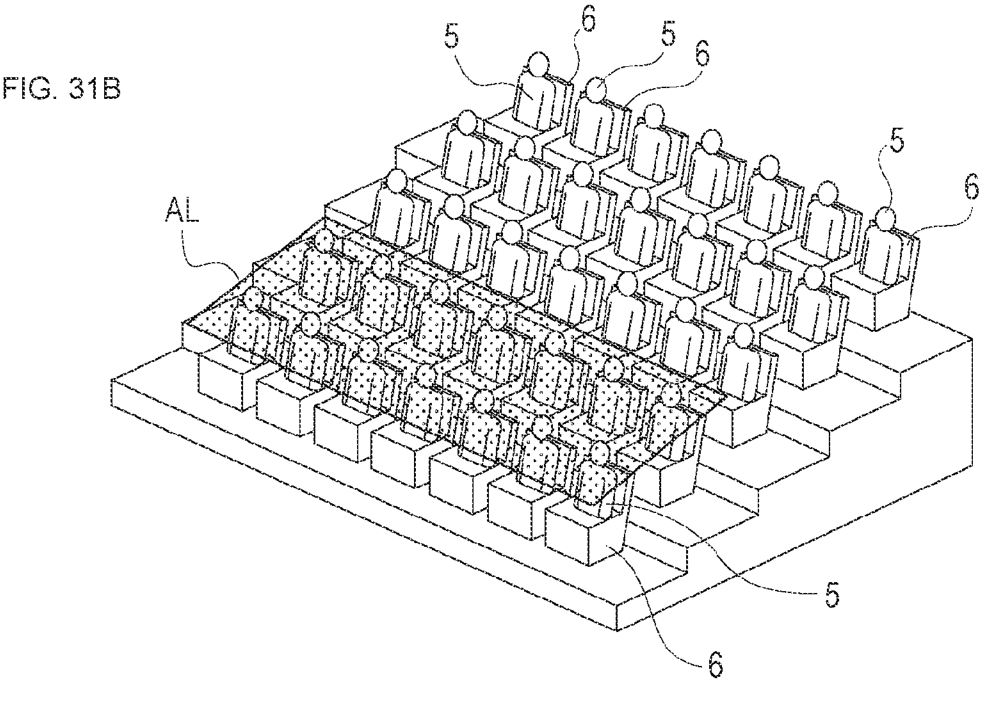

FIGS. 31A and 31B are explanatory diagrams of such adjustment of the sound image localization service area AL. FIG. 31A illustrates a case where the sound image localization service area AL is defined at the center of a seat portion in which the plurality of seats 6 is arranged, and FIG. 31B illustrates a case where the sound image localization service area AL is defined in a part of a front side (here, the front side means a side close to a viewing target) of the seat portion.

For example, it is conceivable that if the viewers 5 concentrate in the vicinity of the center of the seat portion, the adjustment is made to the sound image localization service area AL illustrated in FIG. 31A, and if the viewers 5 concentrate in the vicinity of the front side of a seat region, the adjustment is made to the sound image localization service area AL illustrated in FIG. 31B.

The adjustment of the sound image localization service area AL can be performed by adjusting the incident angle of the plane wave with respect to the sound reflecting surface 31. That is, the adjustment can be performed as adjustment of the inclination angle of the sound reflector 3 or adjustment of the direction in which the plane wave is emitted to the sound reflector 3, specifically, adjustment of the speaker inclination angle in a case of using the plane wave speaker 21B or adjustment by the audio signal processing in a case of using the speaker array 28.

The adjustment of the incident angle of the plane wave with respect to the sound reflecting surface 31 can be performed as pre-adjustment (calibration) for actually allowing the viewers 5 to view viewing content.

Such calibration of the incident angle of the plane wave can be performed to adjust the position and size of the sound image localization service area AL as illustrated in FIGS. 31A and 31B.

Furthermore, the calibration can also be performed so as to realize localization of a sound image as clear as possible in a predetermined target region such as the seat portion. In this case, the adjustment of the incident angle of the plane wave to the sound reflecting surface 31 as the calibration can also be performed on the basis of a result of learning a change in a sound pickup signal of the reflected sound on the sound reflecting surface 31 with respect to a change in the incident angle. More specifically, it is conceivable that artificial intelligence is trained using the change in the incident angle of the plane wave on the sound reflecting surface 31, and the adjustment is performed on the basis of a result estimated by inputting the sound pickup signal of the reflected sound on the sound reflecting surface 31 with respect to the incident angle to a learned model of the artificial intelligence generated after the training.

Figure 32:
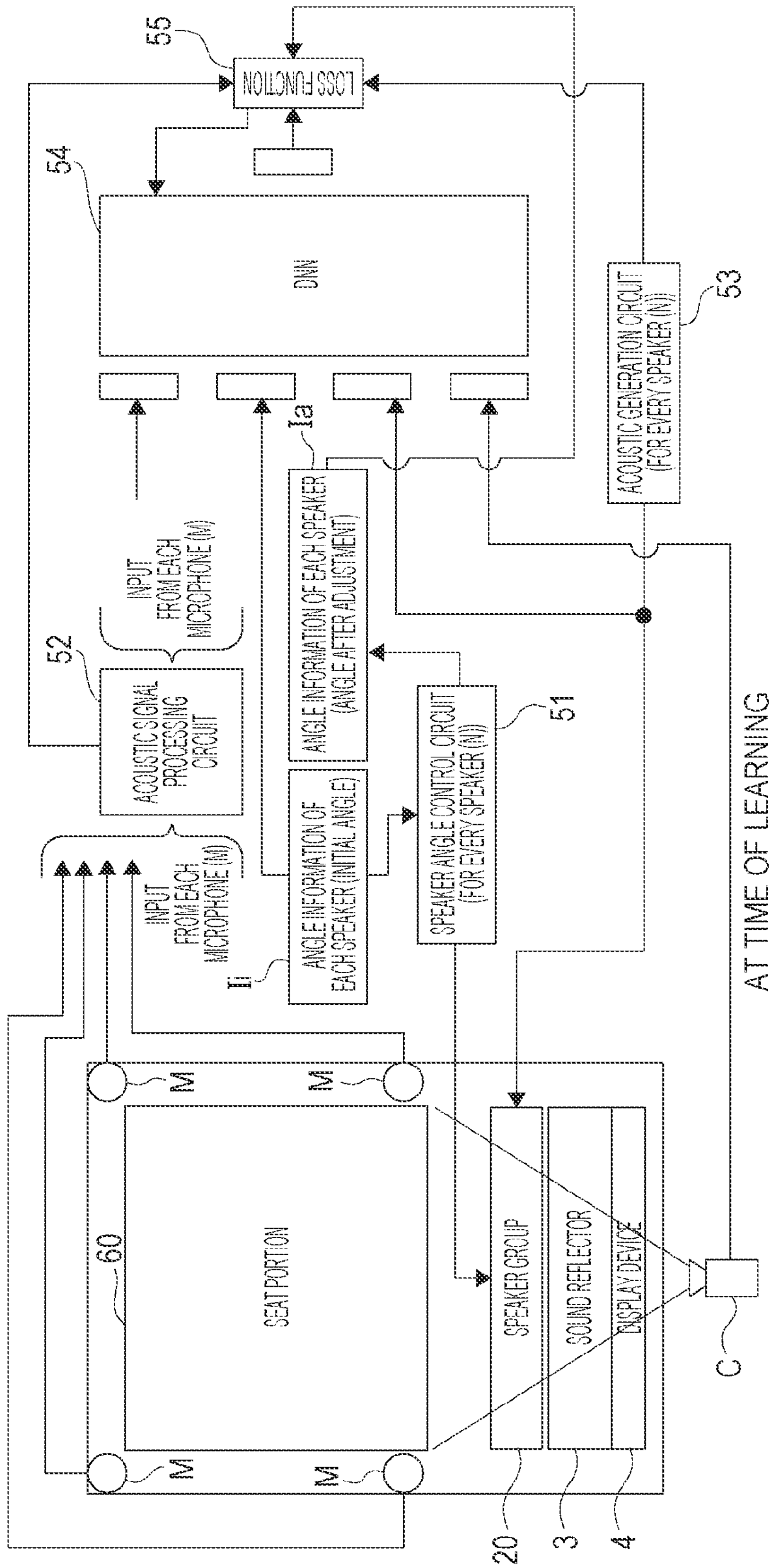
FIG. 32 is a diagram illustrating an example of a configuration for learning by a DNN.
Figure 33:
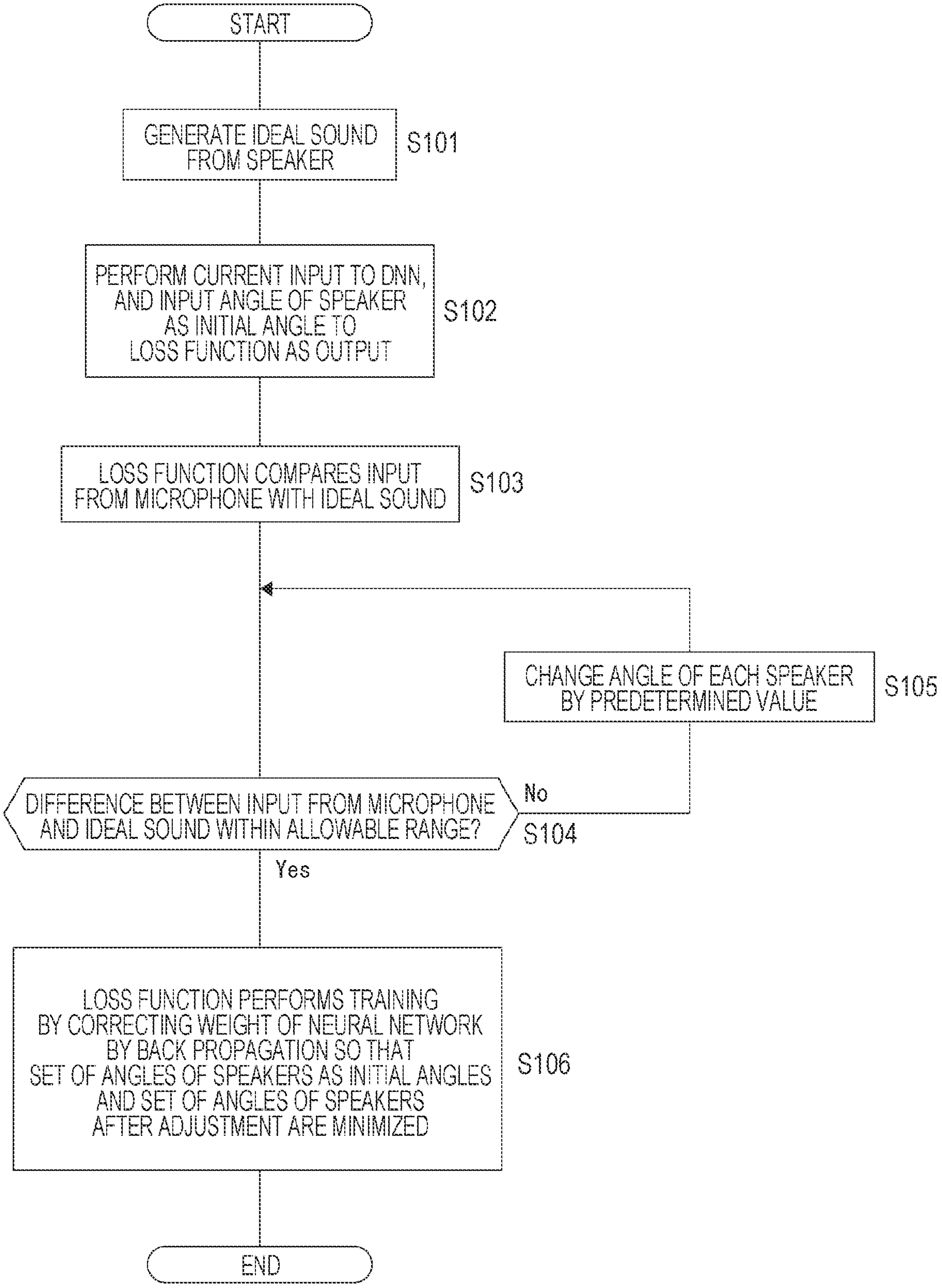
FIG. 33 is a flowchart illustrating an example of a processing procedure at the time of learning.
Figure 34:
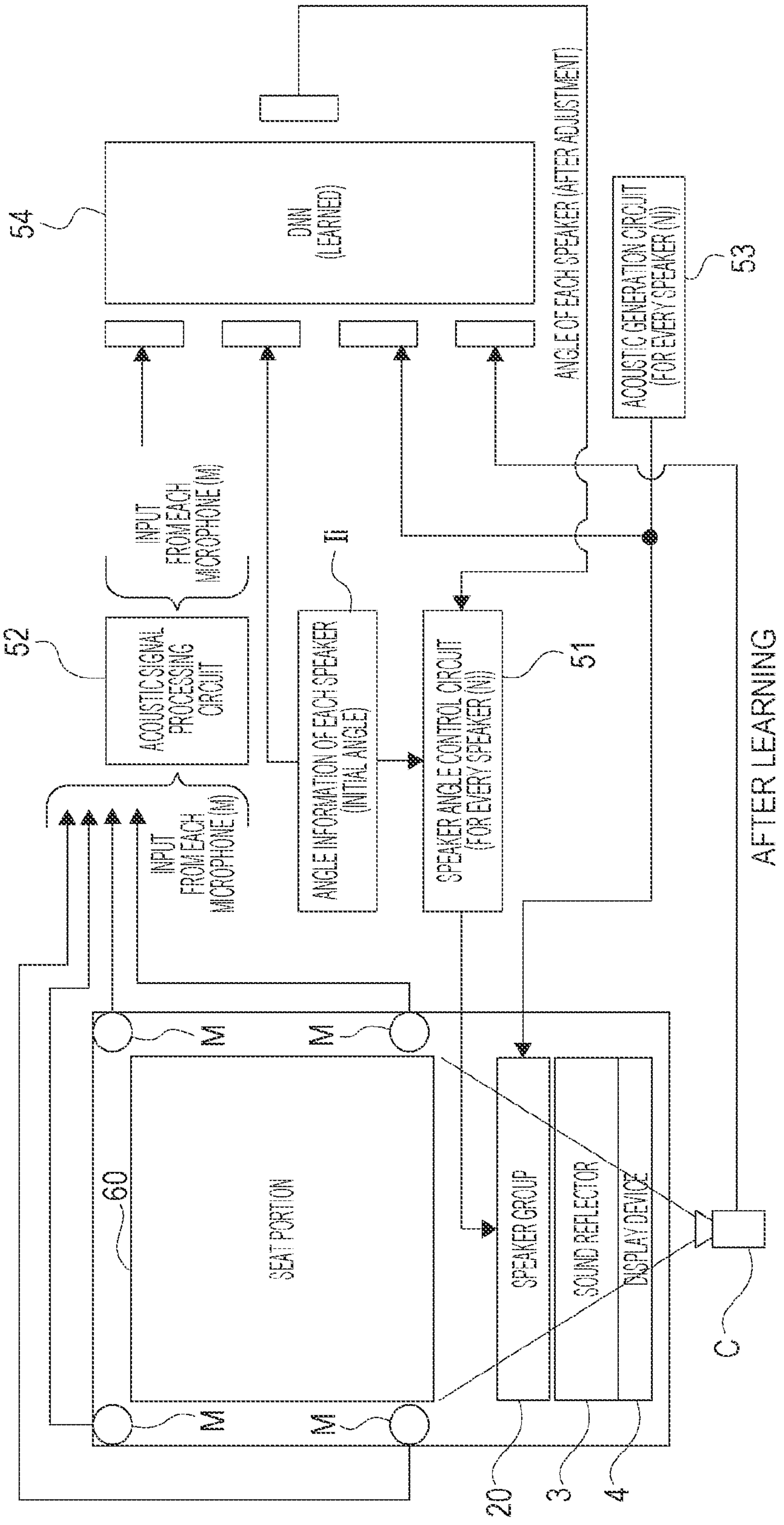
FIG. 34 is a diagram illustrating a configuration for performing calibration using a learned DNN.

FIGS. 32 to 34 are diagrams for describing a device and a method for generating an artificial intelligence model that performs calibration by inputting and training data such as an acoustic signal and angle information, and a device and a method for performing calibration using the generated learned artificial intelligence model. More specifically, a deep neural network (DNN) is used as the artificial intelligence, a learned model is generated by performing training by inputting data to the DNN, and calibration is performed using the generated model.

Note that, as an example of the artificial intelligence, machine learning or the like can be used in addition to the DNN. A neural network constituting the DNN can have various algorithms, forms, and structures such as a convolutional neural network (CNN), a recurrent neural network (RNN), a generative adversarial network, a variational autoencoder, a self-organizing feature map, and a spiking neural network (SNN), and a learned model having a desired input/output relationship can be generated by arbitrarily combining these.

FIG. 32 illustrates an example of a configuration for learning by the DNN.

In the drawing, a seat portion 60 means a region where the plurality of seats 6 is two-dimensionally arranged as viewed from above (a region where the plurality of viewers 5 is assumed to perform viewing) in a room for viewing (hereinafter, simply referred to as "in a room"), for example, a theater facility and the like in which the display device 4 is arranged. Note that, in the theater facility, the seats 6 may be arranged to be inclined as illustrated in FIGS. 31A and 31B, or may be arranged on the same plane like an orchestra pit or arena seats in a concert hall. As illustrated in the drawing, the sound reflector 3 is disposed on a front side of the display device 4, and a speaker group 20 is disposed between the sound reflector 3 and the seat portion 60. In the present example, the speaker group 20 includes the plurality of plane wave speakers 21B (including the angle adjustment units 21*b*). Hereinafter, the number of plane wave speakers 21B in the speaker group 20 is denoted as "N".

In this case, a plurality of microphones M is arranged at predetermined positions in the room. Specifically, in the present example, the microphones M are arranged around the seat portion 60. Hereinafter, the number of microphones M is denoted as M.

Furthermore, a camera C is disposed in the room (or outside the room) in this case. The camera C images a direction of the seat portion 60 from the display device 4 side.

A speaker angle control circuit 51 controls an inclination angle of each of the plane wave speakers 21B constituting the speaker group 20. Note that the speaker group 20 can be configured to emit a plurality of plane waves using the speaker array 28 as illustrated in FIG. 9. In this case, the speaker angle control circuit 51 is configured to control incident angles of the plane waves on the sound reflecting surface 31 by audio signal processing.

An acoustic signal processing circuit 52 inputs a sound pickup signal from each microphone M and performs predetermined acoustic processing on each sound pickup signal. For example, the acoustic processing in this case is generation processing of acoustic characteristic data and the like.

An acoustic generation circuit 53 is provided for every speaker (that is, N), and causes each plane wave speaker 21B in the speaker group 20 to reproduce an arbitrary sound. Furthermore, the acoustic generation circuit 53 can generate acoustic characteristic data for a sound source.

Here, at the time of learning, input of a DNN 54 is as follows:

- a set of results (such as acoustic characteristic data) obtained by subjecting the input from the microphones M to the acoustic processing in the acoustic signal processing circuit 52;
- acoustic characteristic data of the sound source generated by the acoustic generation circuit 53; This can be rephrased as an ideal sound to be heard at each seat 6.
- a set of angles (initial angles: angles before calibration) of the speakers in the speaker group 20 illustrated as angle information Ii of each speaker in the drawing; and
- a captured image from the camera C. Note that the input of the captured image from the camera C may be optional.

Furthermore, output (learning target) of the DNN 54 is a set of angles (angles after adjustment: angles after calibration) of the speakers in the speaker group 20.

A loss function 55 may include software or circuitry that controls backpropagation for causing the DNN 54 to learn. Backpropagation control software or circuitry may be separately equipped in connection with the loss function 55. Input of the loss function 55 is as follows:

- a set of results (such as acoustic characteristic data) obtained by subjecting the input from the microphones M to the acoustic processing in the acoustic signal processing circuit 52;
- acoustic characteristic data of the sound source generated by the acoustic generation circuit 53 (ideal sound to be heard at each seat 6);
- a set of angles (initial angles: angles before calibration) of the speakers in the speaker group 20 as angle information Ii of the speakers; and
- a set of angles (angles after adjustment: angles after calibration) of the speakers in the speaker group 20 indicated as angle information Ia of each speaker in the drawing.

Note that, at the time of learning, in addition to the microphone M as a fixed microphone, a microphone can also be set at each seat 6 at the time of measurement.

FIG. 33 is a flowchart illustrating an example of a processing procedure at the time of learning.

First, the acoustic generation circuit 53 generates an ideal sound from the speaker (step S101). Next, current input is performed to the DNN 54, and an angle of each speaker as an initial angle is input to the loss function 55 as output (step S102).

Next, the loss function 55 compares the input from each microphone M with the ideal sound (step S103), and then, determines whether or not a difference between the input from the microphone M and the ideal sound is within an allowable range (step S104). If the difference between the input from each microphone M and the ideal sound is not within the allowable range, the speaker angle control circuit 51 changes the angle of each speaker by a predetermined value (step S105). This processing is repeated until the difference between the input from each microphone M and the ideal sound falls within the allowable range as a whole. That is, it is repeated until a value of the loss function is minimized with respect to the microphone input.

On the other hand, in a case where the difference between the input from the microphone M and the ideal sound is within the allowable range, the loss function 55 performs training by correcting weight of a neural network by back propagation so that the set of angles of the speakers as the initial angles and the set of angles of the speakers after adjustment are minimized.

At the time of learning, the processing illustrated in FIG. 33 is repeatedly executed for a necessary learning sample.

FIG. 34 illustrates a configuration for performing calibration using the learned DNN 54 (that is, the learned artificial intelligence model).

As can be seen with reference to FIG. 34, at the time of calibration, the same input as before learning is performed to the learned DNN 54, and the speaker angle control circuit 51 adjusts the angle of each speaker in the speaker group 20 on the basis of output from the DNN 54.

By adopting the calibration method using the DNN 54 (that is, the learned artificial intelligence model) as described above, it is possible to generate an algorithm (that is, the learned artificial intelligence model) for calibration that can cope with all cases that can be assumed (for example, an arrangement position of the speaker, a degree to which the viewers 5 enter, and the like) by performing learning only for some of all the cases. Therefore, it is possible to reduce a work load in implementing appropriate calibration.

<3. Modifications>

The embodiment is not limited to the specific example exemplified above, and various modifications are conceivable.

For example, in the above description, the example has been described in which content to be viewed by the viewers 5 is displayed via the display device 4, but the content to be viewed by the viewers 5 can be demonstration content such as a play and the like. In this case, the sound reflector 3 is only required to be arranged between an object related to the demonstration and the viewers 5, for example, arranged between a stage where the play is performed and the viewers 5 and the like.

Furthermore, regarding the sound reflector 3, the sound reflecting surface 31 can be subjected to light antireflection processing such as forming the sound reflecting surface 31 with a light antireflection film and the like. Therefore, it is possible to suppress deterioration of visibility of a video by the viewer 5.

Furthermore, regarding the sound reflector 3, it is assumed that the sound reflecting surface 31 is a flat surface by using a plate-shaped one, but a surface shape other than the flat surface may be adopted for the sound reflecting surface 31. For example, at least a part thereof may have a curved surface.

Furthermore, regarding the sound reflector 3, a film-shaped (sheet-shaped) member can be used instead of a plate-shaped member. By applying tension to the film-shaped sound reflector 3 to make it firm, it can function as a sound reflecting member.

At this time, it is conceivable that the film-shaped sound reflector 3 can be stored by a winding mechanism or can be stored by being folded in a bellows shape.

Furthermore, the sound reflector 3 may be configured such that length of the sound reflecting surface 31 can be adjusted. In particular, in a case where the sound reflector 3 has a film shape, the length of the sound reflector 3 can be adjusted by adjusting a winding amount.

Furthermore, it is also conceivable to provide a dust removing function in consideration of adhesion of dust to the sound reflector 3. Specifically, it is conceivable to remove dust by outputting a specific sound (desirably a low frequency sound) from the plane wave speaker 21 or the speaker array 28 to vibrate the sound reflector 3.

Alternatively, in order to prevent dust from entering a back surface of the sound reflecting surface 31, it is also conceivable to have a configuration in which a space between the display device 4 and the sound reflector 3 is covered with a covering material such as a sheet and the like.

<4. Summary of Embodiment>

As described above, an acoustic reproduction system (1) as an embodiment includes: a sound producing device (2 or 2A) that emits a directional sound; and a sound reflector (3 or 3A) positioned between a viewer and a viewing target by the viewer and having a sound reflecting surface (31 or 31A) that reflects the directional sound emitted by the sound producing device.

The viewing target means an object to be viewed by the viewer, and for example, in a case where content to be viewed is displayed via a display device, a display unit of the display device corresponds to the viewing target. Alternatively, a case where the content to be viewed is demonstration content such as a play and the like is also conceivable. The viewing target in that case corresponds to an object constituting the demonstration content such as a performer, various stage tools arranged on a stage, and the like. By reflecting the directional sound by the sound reflecting surface disposed between such a viewing target and the viewer, a reflection angle of the directional sound can be arbitrarily determined by setting an inclination angle of the sound reflecting surface.

Therefore, it is possible to provide the acoustic reproduction system capable of setting a sound image localization service area at an arbitrary position even in a case where a sound production direction of the directional sound cannot be changed.

Furthermore, in the acoustic reproduction system as the embodiment, the sound producing device emits a sound by a plane wave.

Therefore, attenuation of the sound reflected from the sound reflecting surface to the viewer side is suppressed.

Therefore, it is possible to improve a sense of localization of a sound image.

Moreover, in the acoustic reproduction system as the embodiment, the sound producing device has a sound producing unit configured with a plane wave speaker (21, 21A, or 21B).

As the plane wave speaker, it is conceivable to use a dynamic-based plane wave speaker that vibrates a plane panel by a movable coil, or a plane wave speaker using an electrostatic diaphragm or a piezoelectric diaphragm.

It is not necessary to perform audio signal processing for generating a plane wave as in a case where a plane wave is generated in a pseudo manner by delay processing or the like of an audio signal using a speaker array, and it is possible to reduce a processing load in acoustic reproduction.

Furthermore, in the acoustic reproduction system as the embodiment, the plane wave speaker (21A) has a diaphragm disposed non-parallel to a bottom surface.

With a structure in which the diaphragm is disposed non-parallel to the bottom surface, it is easy to increase volume on a back side of the diaphragm in a case where it is assumed that the plane wave is emitted in an oblique direction.

Therefore, it is easy to expand a reproducible band to a low frequency side.

Furthermore, in the acoustic reproduction system as the embodiment, the sound producing device (2A) includes a speaker array (28) including a plurality of speakers as a sound producing unit, and emits the directional sound from the speaker array by applying predetermined audio signal processing to an audio signal to be output by the speakers in the speaker array.

Therefore, it is possible to adjust an incident angle of the directional sound on the sound reflecting surface without providing a mechanical angle adjustment mechanism for the speaker.

Since the angle adjustment mechanism for the speaker is not required, it is not necessary to consider mechanical durability and a burden of maintenance, and maintenance cost of the acoustic reproduction system can be reduced.

Moreover, in the acoustic reproduction system as the embodiment, the sound reflector has optical transparency.

Therefore, it is possible to suppress deterioration in visibility of the viewing target due to the provision of the sound reflector.

Therefore, it is possible to improve a sense of immersion in the viewing content.

Furthermore, in the acoustic reproduction system as the embodiment, the sound reflecting surface is a half mirror.

Therefore, it is possible to make a video appear on the sound reflecting surface located in front of the viewing target as viewed from the viewer by using the principle of the Pepper's ghost.

Therefore, it is possible to cause the viewer to perceive localization of a sound image and a video that appears to be stereoscopically floating at a specific position on the sound reflecting surface.

Furthermore, in the acoustic reproduction system as the embodiment, the sound reflector is inclined toward the viewer side, and the sound producing device emits the directional sound from a floor side to the sound reflecting surface.

Therefore, a reflected sound from the sound reflecting surface can be inclined upward from a horizontal direction.

Therefore, it is easy to expand the sound image localization service area in a case where a seat arrangement in which a seat position of the viewer becomes higher as a distance from the viewing target increases is adopted.

Moreover, in the acoustic reproduction system as the embodiment, the sound producing device emits the directional sound so as to have an incident angle in a lateral direction with respect to the sound reflecting surface.

Therefore, it is possible for the viewer having a different lateral position with respect to a position where the directional sound is emitted to perceive a sound source position in the vicinity of a reflection position of the directional sound.

Therefore, it is easy to expand the sound image localization service area in the lateral direction. Furthermore, it is possible to reduce the number of speakers to be used to expand the sound image localization service area in the lateral direction.

Furthermore, in the acoustic reproduction system as the embodiment, the sound reflector is formed in a plate shape.

Therefore, it is possible to form the sound reflecting surface without applying tension to the sound reflector as in a case where the sound reflector has a film shape.

Therefore, the sound reflecting surface can be easily formed.

Furthermore, in the acoustic reproduction system as the embodiment, the sound reflector is suspended from a ceiling side.

The suspension-type support system from the ceiling is suitable as a support system for a large and heavy panel.

Therefore, it is suitable for a case where an area of the sound reflector is increased, such as a case where it is desired to entirely cover a front surface side of a large display device and the like.

Moreover, in the acoustic reproduction system as the embodiment, two sound reflecting surfaces (31-1, 31-2) having mutually different inclination directions are provided as the sound reflecting surfaces, and the sound producing device emits the directional sounds from a ceiling side to one of the sound reflecting surfaces and from a floor side to another of the sound reflecting surfaces.

Therefore, it is possible to cause reflected sounds of the directional sounds emitted from the ceiling side and the floor side to cross in a vertical direction in front of the viewers.

Therefore, natural sound spread from a sound source can be reproduced.

Furthermore, the acoustic reproduction system as the embodiment includes a reflector inclination angle adjustment unit (an angle adjustment unit 4*b*) that adjusts an inclination angle of the sound reflector is provided.

Therefore, the incident angle and the reflection angle of the directional sound can be adjusted by adjusting the inclination angle of the sound reflector.

Therefore, the sound image localization service area can be adjusted without adjusting the sound production direction of the directional sound on the sound producing device side.

Furthermore, by including the reflector inclination angle adjustment unit, when the acoustic reproduction system is not used, it is possible to realize a so-called storage state without protruding to the viewer side by setting the inclination angle of the sound reflector to approximately 0 degrees, for example.

Furthermore, the acoustic reproduction system as the embodiment includes a direction adjustment unit (an angle adjustment unit 21*b* or an audio signal processing unit 29) that adjusts a sound production direction of the directional sound is provided.

Therefore, it is possible to adjust the incident angle and the reflection angle of the directional sound with respect to the sound reflecting surface by adjusting the sound production direction.

Therefore, the sound image localization service area can be adjusted.

Moreover, in the acoustic reproduction system as the embodiment, the sound producing device has a sound producing unit configured with a directional speaker, and the direction adjustment unit adjusts the sound production direction of the directional sound by adjusting an angle of the directional speaker.

Therefore, it is not necessary to perform audio signal processing for sound production direction adjustment when adjusting the sound production direction of the directional sound.

Therefore, it is possible to reduce a processing load in acoustic reproduction.

Furthermore, in the acoustic reproduction system as the embodiment, the sound producing device includes a speaker array including a plurality of speakers as a sound producing unit, and emits the directional sound from the speaker array by applying predetermined audio signal processing to an audio signal to be output by the speakers in the speaker array, and the direction adjustment unit adjusts the sound production direction of the directional sound by the audio signal processing.

Therefore, a mechanical drive sound is not generated in adjusting the sound production direction of the directional sound.

Therefore, it is possible to improve quietness when adjusting the sound image localization service area.

Furthermore, in the acoustic reproduction system as the embodiment, the viewing target is a display unit of a self-luminous display device (4, 4A, or 4B).

In a case where content to be viewed is displayed by the display device, it is not possible to adopt a sound image localization method by arranging speakers on the back side of a display surface (screen) as in a case where display is performed by screen projection. It is conceivable to arrange speakers on the left and right of the display surface, but in this case, the display device becomes large.

By applying the sound image localization method by reflecting the directional sound on the sound reflector in a case where the viewing target is the display unit of the self-luminous display device, it is possible to prevent an increase in size of the display device. Furthermore, a space in which the speakers should be originally disposed can be used for enlargement of the display screen, which contributes to effective use of the space and improvement of design.

Moreover, in the acoustic reproduction system as the embodiment, a speaker constituting a sound producing unit of the sound producing device is disposed near a floor between the sound reflector and the viewer.

A theater facility can be exemplified as a facility for showing viewing content. In the theater facility, a certain space is usually taken between a portion where a viewing target is arranged and a seat portion where seats of viewers are arranged.

The speaker arrangement as described above is suitable for the theater facility in which the space is taken between the viewing target and the seat portion.

Furthermore, a display device (4A or 4B) as an embodiment includes a self-luminous display unit (main body 4*a*) that displays a video, and a sound reflector (3 or 3A) disposed in front of a display surface (41) of the video on the display unit and having a sound reflecting surface (31 or 31A) that reflects a sound.

Therefore, the sound reflecting surface is located between a viewer and a viewing target of the viewer. Therefore, in an acoustic reproduction system that reflects a directional sound on the sound reflecting surface to localize a sound image, a reflection angle of the directional sound can be arbitrarily determined by setting an inclination angle of the sound reflecting surface.

Therefore, it is possible to provide the acoustic reproduction system capable of setting a sound image localization service area at an arbitrary position even in a case where a sound production direction of the directional sound cannot be changed.

Furthermore, a calibration method as an embodiment is a calibration method of an acoustic reproduction system including a sound producing device that emits a directional sound, a sound reflector located between a viewer and a viewing target by the viewer and having a sound reflecting surface that reflects the directional sound emitted by the sound producing device, and a control unit that controls an incident angle of the directional sound on the sound reflecting surface, the calibration method including: learning a change in a sound pickup signal of the directional sound reflected by the sound reflecting surface with respect to a change in the incident angle, and adjusting the incident angle on the basis of a result of the learning.

Therefore, it is possible to adjust the incident angle of the directional sound, that is, adjust sound image localization so that a sound received by the viewer approaches a target sound.

Therefore, it is possible to improve clarity of the sound image perceived by the viewer, and it is possible to improve a sense of immersion in content to be viewed.

Note that the effects described in the present specification are merely examples and are not limited, and there may be other effects.

<5. Present Technology>

Note that the present technology can have the following configurations.

(1)

An acoustic reproduction system including:

a sound producing device that emits a directional sound; and a sound reflector positioned between a viewer and a viewing target by the viewer and having a sound reflecting surface that reflects the directional sound emitted by the sound producing device.

(2)

The acoustic reproduction system according to (1), in which the sound producing device emits a sound by a plane wave.

(3)

The acoustic reproduction system according to (2), in which the sound producing device has a sound producing unit configured with a plane wave speaker.

(4)

The acoustic reproduction system according to (3), in which the plane wave speaker has a diaphragm disposed non-parallel to a bottom surface.

(5)

The acoustic reproduction system according to (1) or (2), in which the sound producing device includes a speaker array including a plurality of speakers as a sound producing unit, and emits the directional sound from the speaker array by applying predetermined audio signal processing to an audio signal to be output by the speakers in the speaker array.

(6)

The acoustic reproduction system according to any one of (1) to (5), in which the sound reflector has optical transparency.

(7)

The acoustic reproduction system according to (6), in which the sound reflecting surface is a half mirror.

(8)

The acoustic reproduction system according to any one of (1) to (7), in which the sound reflector is inclined toward the viewer side, and the sound producing device emits the directional sound from a floor side to the sound reflecting surface.

(9)

The acoustic reproduction system according to any one of (1) to (8), in which the sound producing device emits the directional sound so as to have an incident angle in a lateral direction with respect to the sound reflecting surface.

(10)

The acoustic reproduction system according to any one of (1) to (9), in which the sound reflector is formed in a plate shape.

(11)

The acoustic reproduction system according to (10), in which the sound reflector is suspended from a ceiling side.

(12)

The acoustic reproduction system according to any one of (1) to (11), in which two sound reflecting surfaces having mutually different inclination directions are provided as the sound reflecting surfaces, and the sound producing device emits the directional sounds from a ceiling side to one of the sound reflecting surfaces and from a floor side to another of the sound reflecting surfaces.

(13)

The acoustic reproduction system according to any one of (1) to (12), further including:

a reflector inclination angle adjustment unit that adjusts an inclination angle of the sound reflector.

(14)

The acoustic reproduction system according to any one of (1) to (13), further including:

a direction adjustment unit that adjusts a sound production direction of the directional sound.

(15)

The acoustic reproduction system according to (14), in which the sound producing device has a sound producing unit configured with a directional speaker, and the direction adjustment unit adjusts the sound production direction of the directional sound by adjusting an angle of the directional speaker.

(16)

The acoustic reproduction system according to (14), in which the sound producing device includes a speaker array including a plurality of speakers as a sound producing unit, and emits the directional sound from the speaker array by applying predetermined audio signal processing to an audio signal to be output by the speakers in the speaker array, and the direction adjustment unit adjusts the sound production direction of the directional sound by the audio signal processing.

(17)

The acoustic reproduction system according to any one of (1) to (16), in which the viewing target is a display unit of a self-luminous display device.

(18)

The acoustic reproduction system according to any one of (1) to (17), in which a speaker constituting a sound producing unit of the sound producing device is disposed near a floor between the sound reflector and the viewer.

(19)

A display device including:

a self-luminous display unit that displays a video; and a sound reflector disposed in front of a display surface of the video on the display unit and having a sound reflecting surface that reflects a sound.

(20)

A calibration method of an acoustic reproduction system including a sound producing device that emits a directional sound, a sound reflector positioned between a viewer and a viewing target by the viewer and having a sound reflecting surface that reflects the directional sound emitted by the sound producing device, and a control unit that controls an incident angle of the directional sound on the sound reflecting surface, the calibration method including:

learning a change in a sound pickup signal of the directional sound reflected by the sound reflecting surface with respect to a change in the incident angle, and adjusting the incident angle on the basis of a result of the learning.

REFERENCE SIGNS LIST

1 Acoustic reproduction system
2, 2A Sound producing device
21, 21A, 21B Plane wave speaker
21*a* Diaphragm
21*b* Angle adjustment unit
21*c* Shaft
22 Subwoofer
23 High pass filter (HPF)
24 Low pass filter (LPF)
28 Speaker array
28*a* Point sound source speaker
29 Audio signal processing unit
3, 3A Sound reflector
31, 31A Sound reflecting surface
3*a* Frame
4, 4A, 4B Display device
41 Display surface
4*a* Main body
4*b* Angle adjustment unit
4*c* Shaft
5 Viewer
6 Seat
7 Video reproduction system
7*a* Video correction processing unit
8 Acoustic shield
9 Support member
Pt Position
CL Ceiling
FL Floor
Cv Cover
AL Sound image localization service area

The invention claimed is:

1. An acoustic reproduction system, comprising:

a sound producing device configured to emit a directional sound;

a sound reflector positioned between a viewer and a viewing target by the viewer and having a plurality of sound reflecting surfaces that reflects the directional sound emitted by the sound producing device, wherein the plurality of sound reflecting surfaces have mutually different inclination directions; and the sound producing device is further configured to emit the directional sound from a ceiling side to a first sound reflecting surface of the plurality of sound reflecting surfaces and from a floor side to a second sound reflecting surface of the plurality of sound reflecting surfaces.

2. The acoustic reproduction system according to claim 1, wherein the sound producing device is further configured to emit a sound by a plane wave.

3. The acoustic reproduction system according to claim 2, wherein the sound producing device has a sound producing unit configured with a plane wave speaker.

4. The acoustic reproduction system according to claim 3, wherein the plane wave speaker has a diaphragm non-parallel to a bottom surface.

5. The acoustic reproduction system according to claim 1, wherein the sound producing device includes a speaker array including a plurality of speakers as a sound producing unit, and is further configured to emit the directional sound from the speaker array based on application of specific audio signal processing to an audio signal to be output by the speakers in the speaker array.

6. The acoustic reproduction system according to claim 1, wherein the sound reflector has optical transparency.

7. The acoustic reproduction system according to claim 6, wherein the plurality of sound reflecting surfaces is a half mirror.

8. The acoustic reproduction system according to claim 1, wherein the sound reflector is inclined towards viewer side, and the sound producing device emits the directional sound from a floor side to the plurality of sound reflecting surfaces.

9. The acoustic reproduction system according to claim 1, wherein the sound producing device is further configured to emit the directional sound to have an incident angle in a lateral direction with respect to the plurality of sound reflecting surfaces.

10. The acoustic reproduction system according to claim 1, wherein the sound reflector is in a plate shape.

11. The acoustic reproduction system according to claim 10, wherein the sound reflector is suspended from a ceiling side.

12. The acoustic reproduction system according to claim 1, further comprising:

a reflector inclination angle adjustment unit configured to adjust an inclination angle of the sound reflector.

13. The acoustic reproduction system according to claim 1, further comprising:

a direction adjustment unit configured to adjust a sound production direction of the directional sound.

14. The acoustic reproduction system according to claim 13, wherein the sound producing device has a sound producing unit configured with a directional speaker, and the direction adjustment unit is further configured to adjust the sound production direction of the directional sound based on adjustment of an angle of the directional speaker.

15. The acoustic reproduction system according to claim 13, wherein the sound producing device includes a speaker array including a plurality of speakers as a sound producing unit, and is further configured to emit the directional sound from the speaker array based on application of specific audio signal processing to an audio signal to be output by the speakers in the speaker array, and the direction adjustment unit is further configured to adjust the sound production direction of the directional sound by the audio signal processing.

16. The acoustic reproduction system according to claim 1, wherein the viewing target is a display unit of a self-luminous display device.

17. The acoustic reproduction system according to claim 1, wherein a speaker constituting a sound producing unit of the sound producing device is near a floor between the sound reflector and the viewer.

18. A display device, comprising:

a self-luminous display unit configured to display a video; and a sound reflector in front of a display surface of the video on the display unit and having a plurality of sound reflecting surfaces that reflects a sound, wherein the sound corresponds to a directional sound, the plurality of sound reflecting surfaces have mutually different inclination directions, and the directional sound is emitted from a ceiling side to a first sound reflecting surface of the plurality of sound reflecting surfaces and from a floor side to a second sound reflecting surface of the plurality of sound reflecting surfaces.

19. A calibration method of an acoustic reproduction system, including:

a sound producing device configured to emit a directional sound;

a sound reflector positioned between a viewer and a viewing target by the viewer and having a plurality of sound reflecting surfaces that reflects the directional sound emitted by the sound producing device, wherein the plurality of sound reflecting surfaces have mutually different inclination directions;

the sound producing device is further configured to emit the directional sound from a ceiling side to a first sound reflecting surface of the plurality of sound reflecting surfaces and from a floor side to a second sound reflecting surface of the plurality of sound reflecting surfaces; and a control unit configured to control an incident angle of the directional sound on the plurality of sound reflecting surfaces, the calibration method comprising:

learning a change in a sound pickup signal of the directional sound reflected by the plurality of sound reflecting surfaces with respect to a change in the incident angle, and adjusting the incident angle based on a result of the learning.

* * * * *